United States Patent
Odriozola Sagastume

(10) Patent No.: US 10,364,584 B2
(45) Date of Patent: Jul. 30, 2019

(54) WAVE GENERATOR SYSTEM WITH A LATERAL MOVING WAVE BARRIER FOR THE GENERATION OF WAVES IN TWO AREAS OF WATER

(71) Applicant: INSTANT SPORT, S.L., Donostia-San Sebastián (Gipuzkoa) (ES)

(72) Inventor: José Manuel Odriozola Sagastume, Donostia-San Sebastián (ES)

(73) Assignee: INSTANT SPORT, S.L, Donostia, (Gipuzkoa) (ES)

( * ) Notice: Subject to any disclaimer, the term of this patent is extended or adjusted under 35 U.S.C. 154(b) by 0 days.

(21) Appl. No.: 15/773,269

(22) PCT Filed: Nov. 3, 2016

(86) PCT No.: PCT/ES2016/070774
§ 371 (c)(1),
(2) Date: May 3, 2018

(87) PCT Pub. No.: WO2017/077156
PCT Pub. Date: May 11, 2017

(65) Prior Publication Data
US 2018/0320395 A1  Nov. 8, 2018

(30) Foreign Application Priority Data

Nov. 6, 2015 (ES) .................................. 201531602
Oct. 7, 2016 (ES) .................................. 201631302

(51) Int. Cl.
*A47K 3/10* (2006.01)
*E04H 4/00* (2006.01)
*A63B 69/00* (2006.01)

(52) U.S. Cl.
CPC ....... *E04H 4/0006* (2013.01); *A63B 69/0093* (2013.01)

(58) Field of Classification Search
CPC ..................... E04H 4/0006; A63B 69/0093
USPC ................................. 405/79; 472/128; 4/491
See application file for complete search history.

(56) References Cited

U.S. PATENT DOCUMENTS

| 4,976,570 | A | 12/1990 | Davis |
| 5,342,145 | A | 8/1994 | Cohen |
| 2010/0011497 | A1 | 1/2010 | Johnson |
| 2010/0017951 | A1 | 1/2010 | Odriozola Sagastume |
| 2010/0088814 | A1 | 4/2010 | Johnson |

(Continued)

FOREIGN PATENT DOCUMENTS

| GB | 2106383 A | | 4/1983 |
| JP | 1-210568 | * | 8/1989 |

(Continued)

*Primary Examiner* — Sunil Singh
(74) *Attorney, Agent, or Firm* — Browdy and Neimark, PLLC

(57) ABSTRACT

Wave generator system (1), comprising a continuous and elongated barrier (4) that has a front side (4a) facing a first mass of water (2) fitted with a first reef (12) and a rear side (4b) facing a second mass of water (3) fitted with a second reef (15). The barrier (4) can move along the length (L) with a serpentine movement, and the front (4a) and rear sides (4b) push water from the masses of water (2, 3) towards the respective reefs (12, 15) for the formation of waves in the first mass of water (2) and in the second mass of water (3).

25 Claims, 15 Drawing Sheets

(56) References Cited

U.S. PATENT DOCUMENTS

2014/0250579 A1 9/2014 Slater et al.
2015/0252578 A1 9/2015 Fricano

FOREIGN PATENT DOCUMENTS

| WO | 2012150908 A1 | 11/2012 |
| WO | 2013071362 A1 | 5/2013 |
| WO | 2014074664 A1 | 5/2014 |
| WO | 2015082871 A1 | 6/2015 |

* cited by examiner

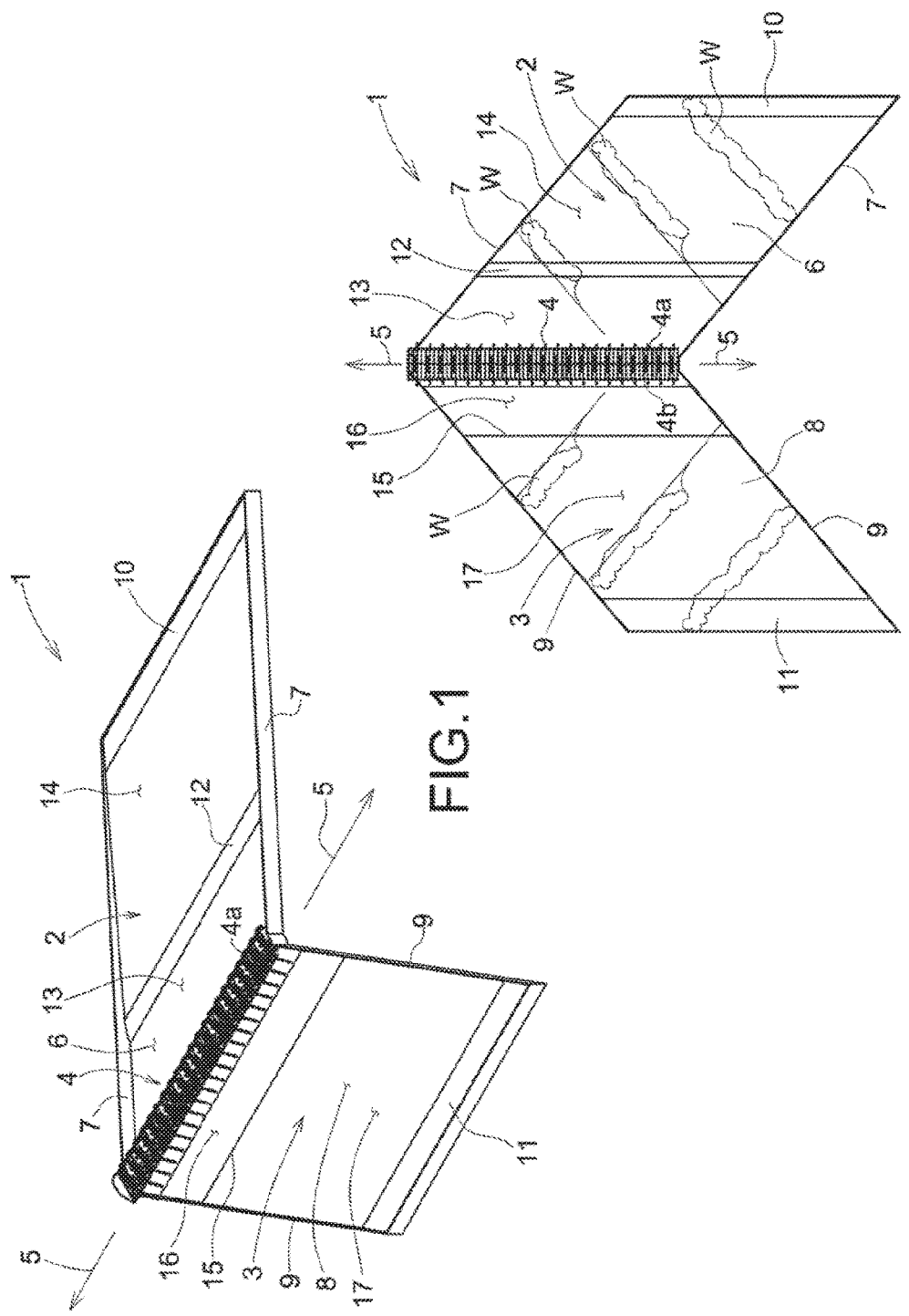

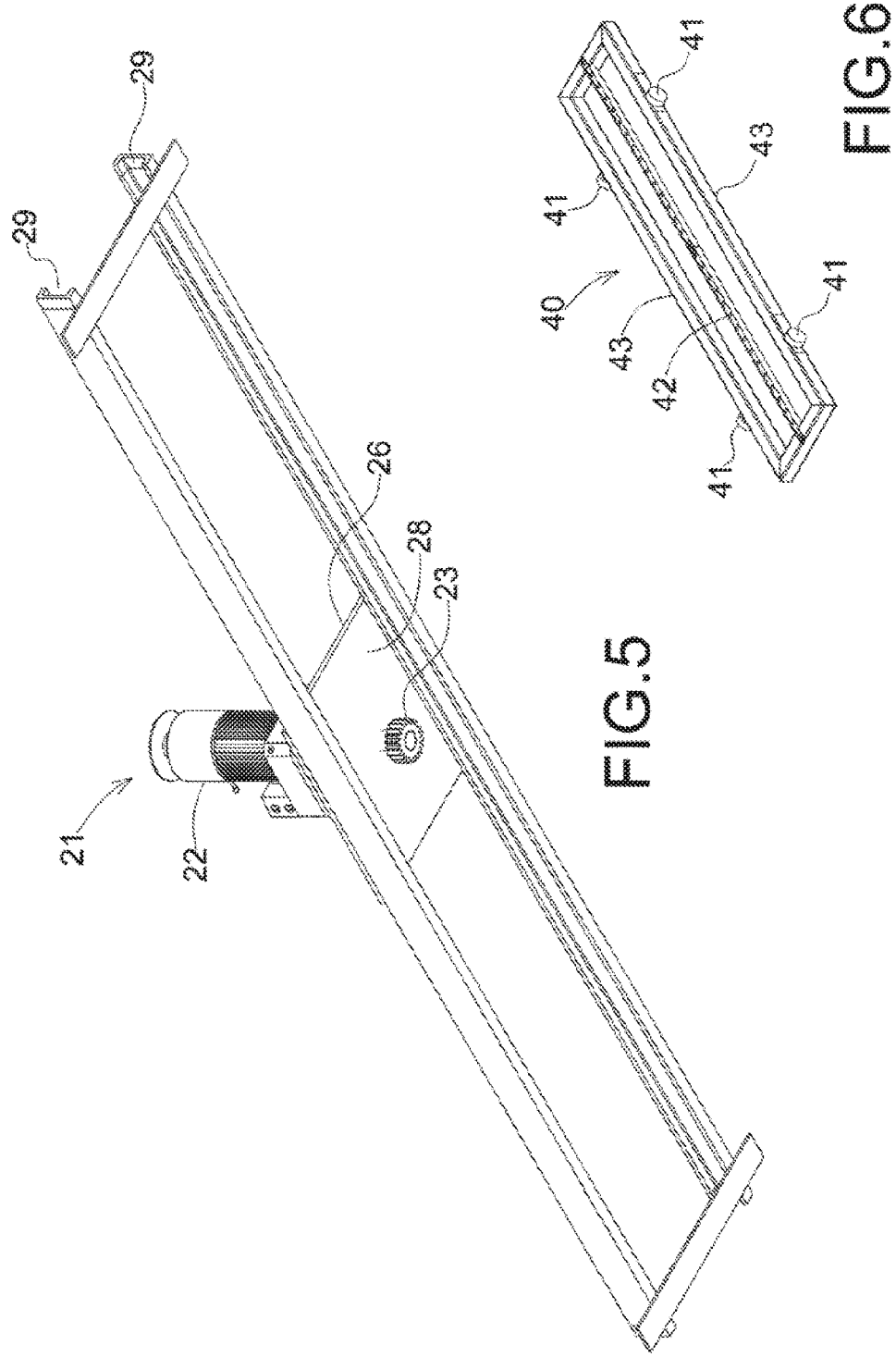

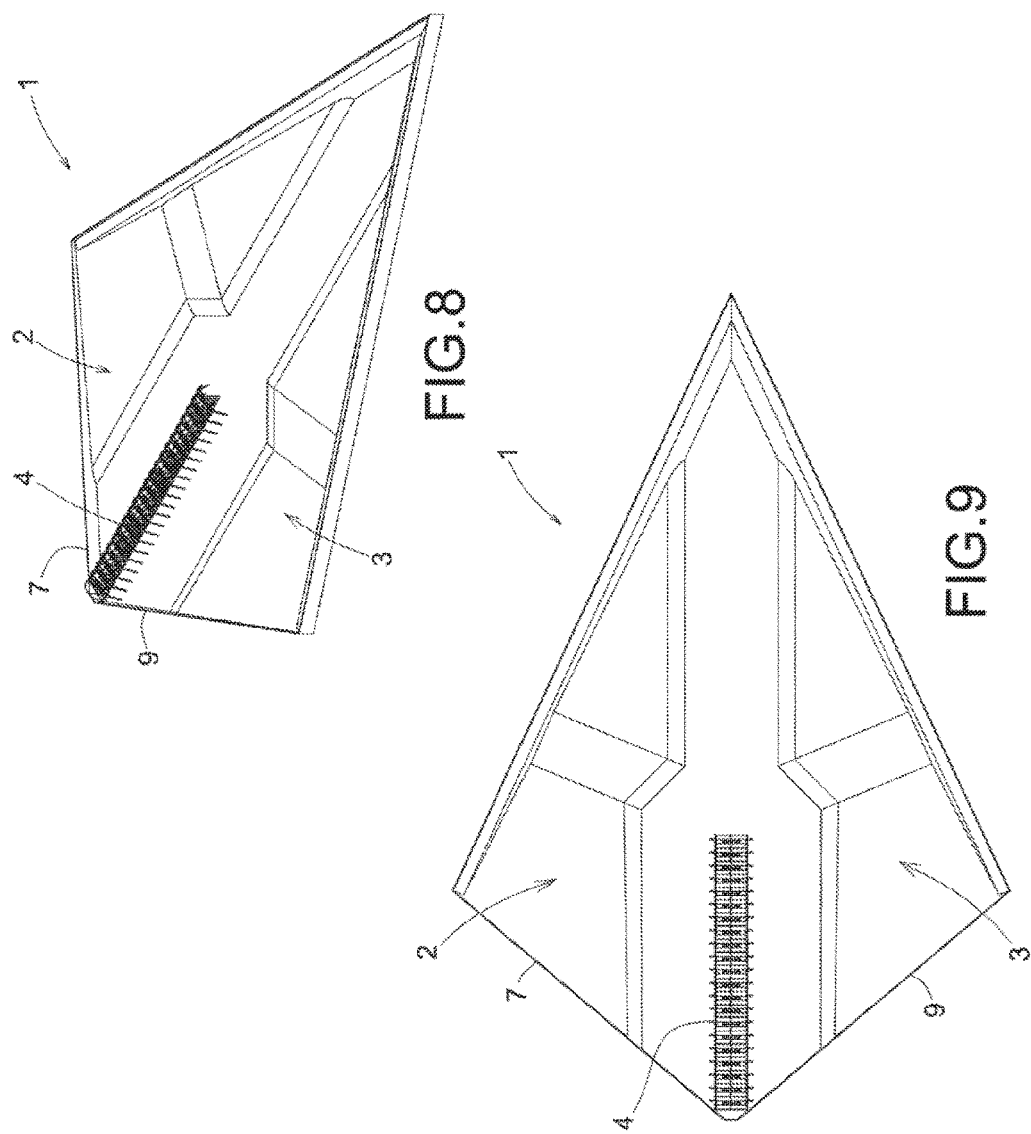

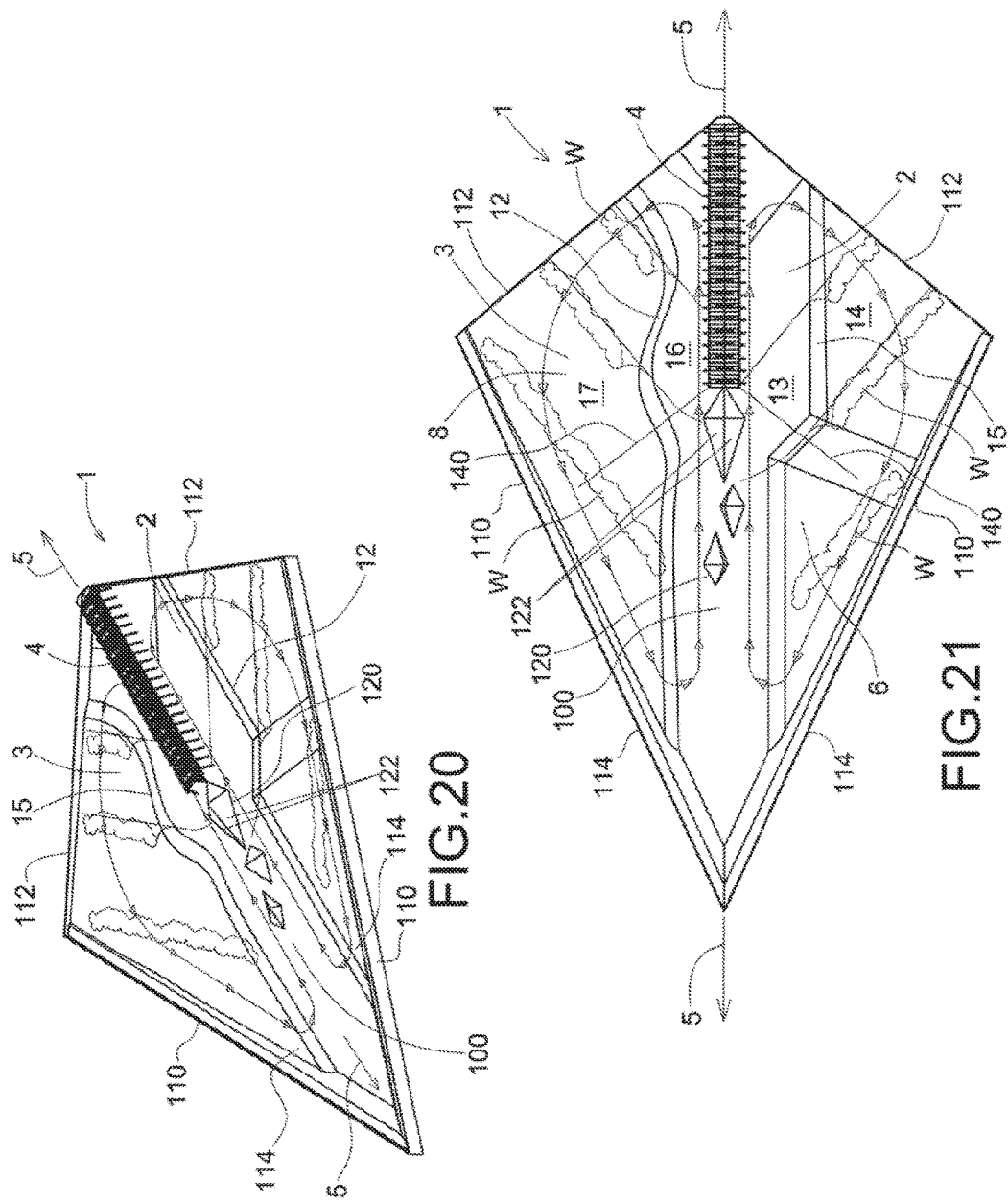

WAVE GENERATOR SYSTEM WITH A LATERAL MOVING WAVE BARRIER FOR THE GENERATION OF WAVES IN TWO AREAS OF WATER

FIELD OF THE INVENTION

The invention relates to a wave generator system in an aquatic medium, and particularly to a wave generator system using a series of pistons that act in sequence and generate a double wave, i.e. a wave in front of the series of pistons and another wave behind the series of pistons.

PRIOR ART

Many designs of devices and wave generator systems in an aquatic medium are known in the prior art, the aim of which is to artificially generate waves in the aquatic medium for human enjoyment and leisure purposes. Wave generator systems for sports like surfing are also known.

Wave generator systems intended for surfing have an added complexity with respect to other wave generation systems or devices. More specifically, these systems seek the formation of a wave having very precise characteristics and shapes, simulating certain breaking waves that are produced naturally in the sea. On one hand, the wave must be high and preferably dynamic, i.e. move forwards. In addition, the wave must move quite fast and, if possible, break gradually, i.e. present a non-breaking area and a breaking area. Furthermore, the ideal wave must preferably have a barrel in which the surfer can carry out his/her routines or techniques. Obtaining a wave that is suitable for surfing is an extremely complex task; in fact, it been considered for years that the perfect artificial wave, exactly simulating a natural wave, does not exist or is impossible to generate.

An example of a wave generator system is based on moving and/or tilting a plate, blade or piston to cause agitation in the water. The use of a piston is constructively relatively simple, and effective in producing waves or agitation in the aquatic medium. A piston is understood to be a panel which repeatedly moves backwards and forwards within a mass of water, which is repeatedly tilted backwards and forwards within a mass of water, or which presents a combination of both movements (translation and tilting) with respect to a mass of water, in order to move water horizontally.

In an attempt to generate surfable waves using the piston technique, wave generator systems have been developed based on a series of pistons that are aligned or placed in a row, and operate in a sequence to obtain a wave that breaks gradually and with an optional barrel, the wave suitable for surfing. Examples of such systems can be found in U.S. Pat. Nos. 6,920,651, 4,062,192 and 4,783,860.

Due to the fact that surfable waves must be relatively high and rapid and hence transport a high amount of energy, the electrical consumption required for surfable wave generator systems is very high, often making such systems economically unviable in practice. Wave generator systems known in the prior art usually try to increase the economic viability of the systems by increasing the number of waves that the system is capable of generating per time unit, among others, as this will enable the system to be used by more users over time and hence increase revenue from the operation of the system.

This invention aims to create a surfing wave generation system based on pistons that is economically viable and can be successfully operated in practice.

BRIEF DESCRIPTION OF THE INVENTION

An object of the invention is a wave generation system comprising a continuous and elongated barrier, arranged in a longitudinal direction. The barrier has a front side and a rear side along a length of the barrier. The front side is facing a first mass of water, whilst the rear side is facing a second mass of water. The barrier prevents the passage of water from the first mass of water towards the second mass of water, and vice versa. A first reef is arranged on a floor under the first mass of water, at a certain distance from the barrier. Similarly, a second reef is arranged on a floor under the second mass of water, at a certain distance from the barrier. The barrier is movable along its whole length with a serpentine movement that forms lateral undulations on its front side and on its rear side. The undulations move reciprocally towards the first mass of water and the second mass of water. The front side pushes water from the first mass of water towards the first reef to form a wave in the first mass of water. In turn, the rear side pushes water from the second mass of water towards the second reef to form a wave in the second mass of water.

The wave generator system enables a high number of waves to be generated as it simultaneously generates waves in two directions, i.e. towards two, the first and second areas. Furthermore, the waves present a gradual breaking, carry a high amount of energy and are suitable for surfing, while the generator system requires reasonable energy consumption, a reasonable volume of water, a reasonable surface area of the total mass of water and a reasonable surface area of the system in general (often referred to as a "footprint" of the system). All of this helps make the system economically viable and allows the system to be successfully put into practice.

Another aspect of the invention is a wave generator system comprising a wave generator, a mass of water and a reef formed on a floor beneath the mass of water. The reef provides a transition between a deeper area located between the reef and the wave generator and a shallower area located beyond the reef. The wave generator faces the mass of water to cause the displacement of water towards the reef and the formation of a wave in the mass of water. The reef is at least partially surrounded by a channel that is deeper than the shallower area and connects the deeper area with an end of the shallower area through which the wave exits the shallower area. The water displaced by the wave generator can be guided back by the channel towards the deeper area between the wave generator and the reef for generating new waves, without interfering with the surfable waves traveling along the shallower area.

BRIEF DESCRIPTION OF THE FIGURES

The details of the invention can be seen in the accompanying figures, which do not intend to limit the scope of the invention:

FIG. 1 shows a perspective view of a wave generator system in accordance with an illustrative embodiment of the invention, with a moving barrier based on plates or pistons that present a sideways translational movement with respect to the longitudinal direction of the barrier, wherein the system is fitted with lateral edges in the form of contiguous vertical walls at the ends of the barrier.

FIG. 2 shows a top plan view of the system of FIG. 1.

FIG. 5 shows a bottom perspective view of a frame and of a motor and transmission set associated with a piston.

FIG. 6 shows a top perspective view of a carriage associated with a piston.

FIG. 8 shows a perspective view of an alternative wave generator system, devoid of the lateral edges in just one of the ends of the barrier.

FIG. 9 shows a top plan view of the system in FIG. 8.

FIG. 20 shows a perspective view of another embodiment of a wave generator system as per the invention, with a curved reef and a straight reef, and fitted with a deep channel for the return of water towards the barrier.

FIG. 21 shows a top plan view of the system of FIG. 20.

DETAILED DESCRIPTION OF THE INVENTION

Figure 3:
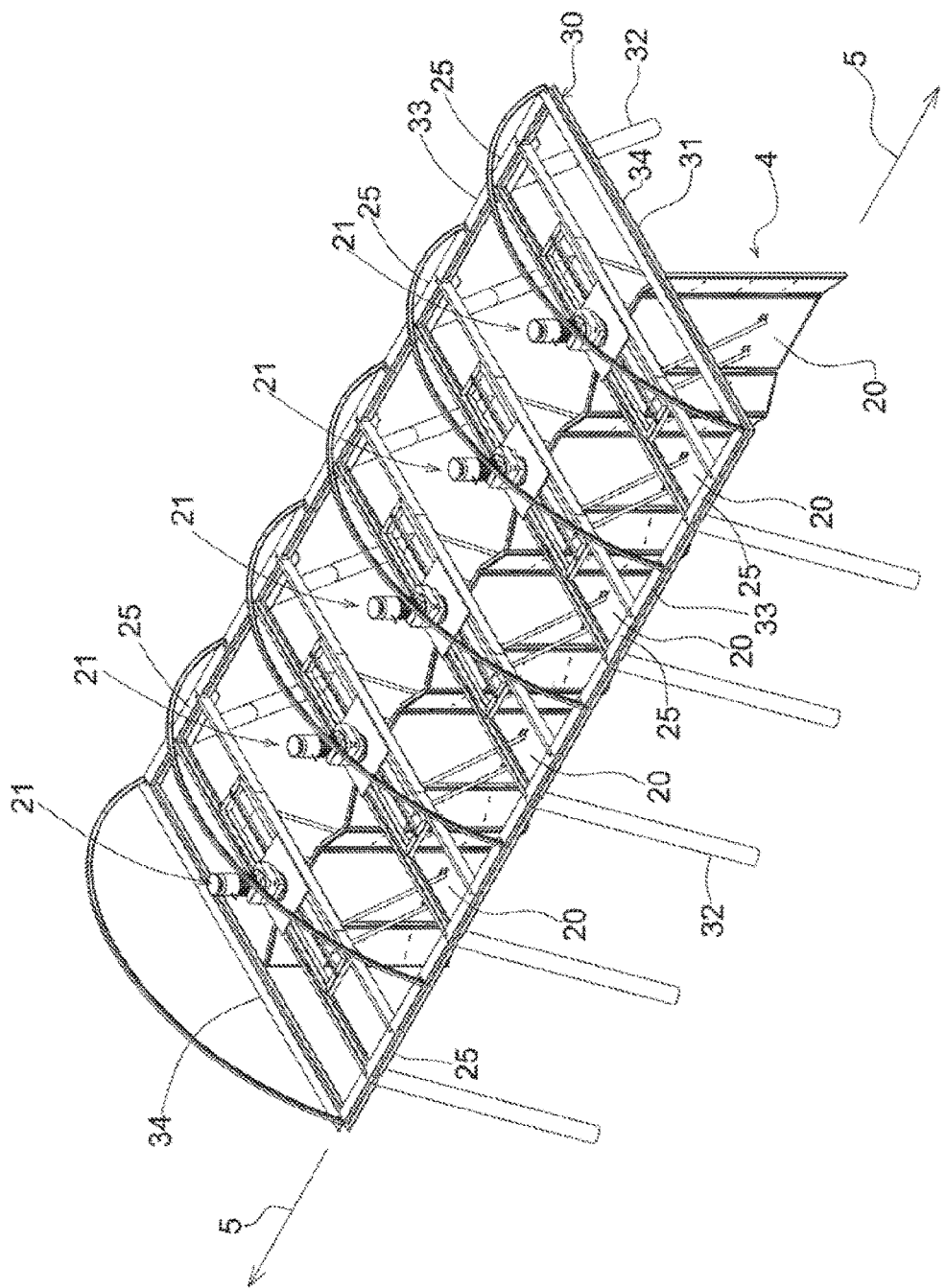
FIG. 3 shows a perspective view of five pistons included in the barrier of the system of FIG. 1, along with their drive mechanisms and associated support structures.

A first aspect of the present invention relates to an artificial wave generation system based on the serpentine movement of an elongated, continuous movable barrier, in such a way that the barrier moves reciprocally towards two opposing masses of water on each side of the barrier. The barrier is built in such a way that it prevents the passage of water between the two masses of water. In its serpentine movement, the barrier pushes water alternatively towards each mass of water and generates waves in each mass of water.

FIGS. 1 to 7, 10 and 15 show a first embodiment of the invention. Referring initially to FIGS. 1 and 2, these figures show a perspective view and a top plan view of a wave generator system (1) that enables surfable waves to be generated in a first mass of water (2) and in a second mass of water (3). To do so, the system (1) comprises a wave generator in the form of a continuous and elongated barrier (4), arranged in a longitudinal direction (5). The wave generator or barrier (4) is movable with a serpentine movement and reciprocally towards the first mass of water (2) and the second mass of water (3). The barrier (4) is not permeable, i.e. it prevents the passage of water between the first mass of water (2) and the second mass of water (3) through the barrier (4), both when the barrier (4) is still and when it is in movement. Furthermore, the barrier (4) is preferably arranged substantially against the floor of the system under the barrier (4), so that the barrier (4) significantly prevents the passage of water under the barrier (4) between the first mass of water (2) and the second mass of water (3). By "substantially preventing the passage of water" it is understood that it is not essential for the barrier (4) to have watertight contact with the floor; a slight tolerance or separation of some millimeters or fraction of a centimeter (preferably less than one centimeter) is allowed between the floor of the system. Similarly, there can be a slight tolerance or gap (preferably less than one centimeter between the different moving elements of the barrier (4), which will be described hereinafter, and between these moving elements and possible vertical surfaces that, in some embodiments, can be located contiguous to the barrier (4). The functioning and the serpentine movement of the barrier (4) are explained in greater detail hereinafter.

A floor (6) is disposed under the first mass of water (2), and two opposing lateral edges (7) are disposed on the sides of the first mass of water (2). Similarly, a floor (8) is disposed under the second mass of water (3), and two opposing lateral edges (9) are disposed on the sides of the second mass of water (3). In the depicted embodiment, the lateral edges (7) of the first mass of water (2) are straight, vertical walls that are parallel to each other. In alternative embodiments, however, it is contemplated that the lateral edges (7) may present a non-vertical configuration, for instance in the form of a sloped shore, or may combine various shapes, such as a vertical wall closer to the barrier (4) followed by a sloped shore. In some embodiments, it is contemplated that the lateral edges (7), alternatively or additionally to being straight, may also be curved or with any other applicable layout. In different embodiments of the invention, it is also contemplated that the lateral edges (7) may not be parallel to each other, or may not present similar shapes or configurations. All of these variants are equally applicable to the lateral edges (9) of the second mass of water (3). Furthermore, the lateral edges (7) of the first mass of water (2) and the lateral edges (9) of the second mass of water (3) may be symmetrical to each other with respect to the barrier (4), i.e. with respect to a vertical symmetry plane that contains the longitudinal direction (5) of the barrier (4), as in the illustrated embodiment. Alternative embodiments are also contemplated in which the lateral edges (7) of the first mass of water (2) and the lateral edges (9) of the second mass of water (3) present different shapes, sizes, configurations and/or layouts. On the other hand, the lateral edges (7) of the first mass of water (2) may be placed at any distance and forming any angle with the lateral edges (9) of the second mass of water (3). It is also contemplated that one or both lateral edges (7, 9) do not exist, and that the first mass of water (2) and the second mass of water (3) merge together or communicate at one or both longitudinal ends of the barrier (4). For example, an alternative system (1) is shown in FIGS. 8 and 9, in which lateral edges (7, 9) are provided extending from one longitudinal end of the barrier (4) located on the left side of the figures, and in which no edges are included in the opposite end of the barrier, located on the right side in the figures, so that the masses of water (2, 3) communicate at this end.

Referring again to FIGS. 1 and 2, in regard to the distal ends of the system (1), the drawings show shores (10, 11) in the form of a sloping ramp at the ends of the first mass of water (2) and the second mass of water (3), by means of example. In alternative embodiments, instead of shores in the form of a ramp, there may be terminations such as swimming pools, lakes, widenings, curved shores, etc. The first mass of water (2) and the second mass of water (3) may have any length and width. The width of the first area of water (2) may be constant or variable; for example, if there are two lateral edges (7) in the first mass of water (2), these lateral edges (7) may or may not be parallel to each other. Likewise, if there are any lateral edges (9) in the second mass of water (2), they may or may not be parallel to each other.

As shown in FIGS. 1 and 2, the first mass of water (2) is provided with a first reef (12) formed on the floor (6) of the first mass of water (2). A reef is understood to be an area of the floor providing a change in slope and acting as a transition area between a deeper area that is closer to the barrier (4) and a shallower area that is farther from the barrier (4). More specifically, in this embodiment, the first reef (12) is a transition area in the form of a ramp or sloped plane that provides a change in depth between a deeper area (13) of the floor (6), located closer to the barrier (4), and a shallower area (14) of the floor (6), located farther from the barrier (4), and that separates both areas (13, 14). Similarly, a second reef (15) is formed in the second mass of water (3), on the floor (8) under this second mass of water (3). The second reef (15) of the present is shaped as a vertical wall that provides a change in depth in the form of a step between a deeper area (16) of the floor (8), located closer to the barrier (4), and a shallower area (17) of the floor (8), located farther from the barrier (4). The second reef (15) separates both areas (16, 17).

According to the invention, as shown in the top plan view of FIG. 2, the first reef (12) and the second reef (15) are arranged at a certain distance from the barrier (4) and substantially parallel to the longitudinal direction (5) of the barrier (4). For example, one or both reefs (12, 15) may be substantially straight and form an angle of −20 to 20 degrees with the longitudinal direction (5).

Optionally, the floor (6) of the first mass of water (2) and/or the floor (8) of the second mass of water (3) may be horizontal from the barrier (4) to the corresponding reef (12, 15), as in the present embodiment. Alternatively, it is contemplated one or both of the floor (6) under the first mass of water (2) and the floor (8) under the second mass of water (3) adjacent to the barrier (4), i.e. from the barrier (4) to the corresponding reef (12, 15), may have an increasing height towards the corresponding reef (12, 15).

In order to illustrate the barrier (4) in the system (1), FIG. 3 shows an enlarged perspective view of part of the barrier (4). As shown, the barrier (4) of the present embodiment comprises a set of pistons (20) or rigid plates that are movable backwards and forwards; the pistons (20) move with a time offset between them, forming reciprocal undulations towards one transverse side and towards the other, producing the effect of an undulation forming in the barrier (4) and moving in the longitudinal direction (5).

Although the figure only shows five pistons (20), the explanation below in relation to the operation of the pistons (20) applies to all of the piston sets (20) in the barrier (4). Each of the pistons (20) is operated by an independent drive system (21) located on top of the piston (20), and is suspended as explained hereinafter. The pistons (20) and corresponding drive systems (21) are supported by a support structure (30). The support structure (30) comprises an upper structure (31), supported on the floor by legs (32) situated on the opposing transverse sides of the upper structure (31). In this illustrative embodiment, the support structure (30) is formed of longitudinal bars or beams (33) and transverse bars or beams (34). The set of pistons (20) hangs from this upper structure (31).

The fact that each piston (20) is operated by a drive system (21) located on top of the piston (20) offers several advantages. On one hand, the civil works required to build a machine room for the system (1), i.e. for housing the drive systems (21), is minimised. For example, a single flat floor can be built for supporting the structure, the floor and structure occupying a minimum area in top plan view. An additional significant advantage is that the entire mechanics of the drive system (21) can be located at reasonable cost in a dry area, isolated from water and easily accessible (for instance, a walkway may be provided above the upper structure with openings to access the interior of the (31) support structure (30)); this facilitates adapting the system to prevailing swimming pool regulations. The support structure (30) may also carry out the function of supporting a net that isolates the machinery from the users, so that users cannot come into contact with any moving elements or any components of the machinery.

Figure 4:
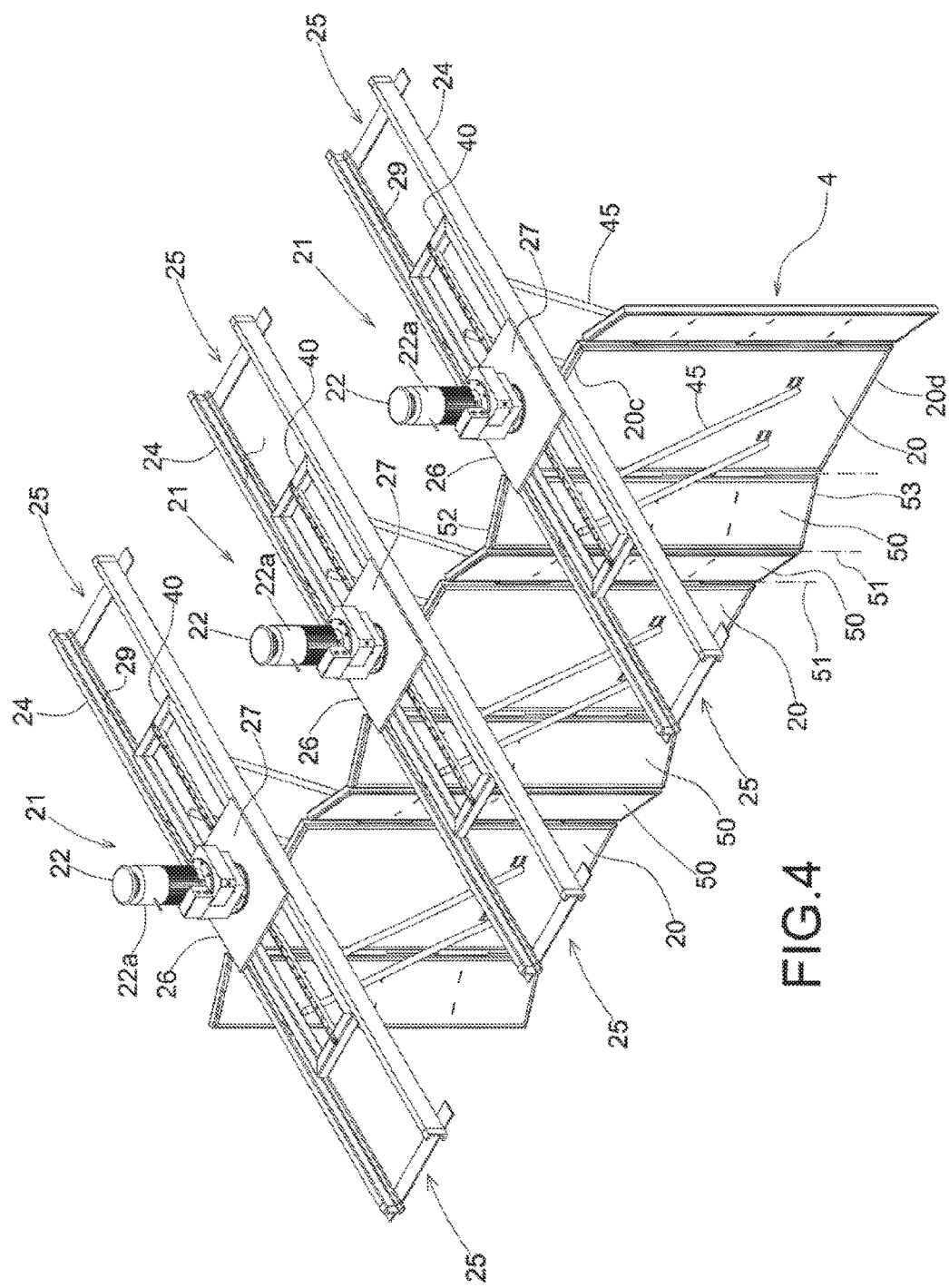
FIG. 4 shows an enlarged perspective view of three pistons of the previous figure along with their corresponding drive systems.

FIGS. 4 to 6 show three additional views that allow understanding the drive systems (21) of the pistons (20). As shown, each drive system (21) comprises an electrical driving motor and transmission set (22) that causes the respective pinion (23), visible in FIG. 5, to rotate. Each electrical driving motor and transmission set (22) is mounted on and supported by a respective frame (24). The frame (24) has two transverse ends (25) configured to be secured to the longitudinal beams (33) of the upper structure (31), so that this frame (24) is supported by and suspended between these longitudinal beams (33), as shown in FIG. 3. The majority of the electrical driving motor and transmission set (22) protrudes from an upper side (27) of a plate (26) of the frame (24) and above the frame (24) itself, whilst the pinion (23) protrudes from a lower side (28) of the plate (26) of the frame (24), as shown more clearly in FIG. 5. Each frame (24) comprises lateral guide channels (29), which are placed in a transverse direction (with respect to the longitudinal direction (5) of the barrier (4)), on opposing sides of the pinion (23), straight and parallel to each other. The frame (24) of the present embodiment is fixed, i.e. does not move during the normal functioning of the system (1).

FIG. 6 shows a perspective view of a carriage (40) associated with each piston (20) of the barrier (4)—more specifically, each piston (20) is suspended from its respective carriage (40)—. The carriage (40) comprises lateral wheels (41) arranged on opposite sides of the carriage (40), and a rack (42) positioned between the lateral wheels (41) in a transverse direction (with respect to the longitudinal direction (5) of the barrier (4)). The carriage (40) is configured to be coupled to the frame (24) in a movable manner with respect to the frame (24). More specifically, the lateral wheels (41) of the carriage (40) are configured to roll along the guide channels (29), which laterally retain and guide the carriage (40). In turn, the rack (42) engages with the pinion (23) so that, when the pinion (23) rotates around its central axis, and since the pinion (23) is transversely secured, rotation of the pinion (23) causes the movement of the rack (42) and therefore the whole carriage (40) with respect to the frame (24) in the transverse direction. FIG. 4 shows the carriages (40) coupled to the guide channels (29) of the respective frames (24). When the system (1) is generating waves (W), as shown in FIG. 2, each carriage (40) moves alternatively backwards and forwards along its respective frame (24), with a time offset with respect to the adjacent carriages (40) so that some carriages (40) move forwards and others move backwards forming a serpentine movement, whilst maintaining the electrical driving motor and transmission sets (22) and the frames (24) in a fixed position. The movement of the carriages (40) causes the movement of the pistons (20) which are suspended from the carriages (40).

The aforementioned system is advantageous in that it allows isolating the electrical part, i.e. the electrical driving motor and transmission set (22), almost in its entirely in a dry area above the frame (24). More specifically, as shown in FIG. 4, the motors (22a) of the electrical driving motor and transmission sets (22) are entirely above the frame (24). Furthermore, the system is advantageous in that the electrical driving motor and transmission sets (22) do not move along with the pistons (20) but rather remain fixed, i.e. in a fixed position with respect to the support structure (30) and the frames (24); having fixed motors simplifies the system's electrical installation; furthermore, the required openings through the frame (24) can be minimised and this greatly facilitates the isolation or watertightness of the dry area located above the frames (24) of the wet area below the frames (24), as it is practically only necessary to create holes for the passage of the axles that rotate the pinions (23); furthermore, the safety of any people that may be walking above the frames (24) (if the frames (24) are covered by sheets or similar) is increased, as the risk of getting trapped is reduced as there are no moving pieces or mechanisms in the dry area above the frames (24). The fact that the electrical driving motor and transmission sets (22) are above the pistons (20) and the pistons (20) are suspended is also advantageous because it helps that the barrier (4) can extend to the floor and can enable moving all of the water, from the floor to the crest of the wave, and hence make efficient use of the energy consumed by the system to generate waves.

Referring once more to the suspended layout of the pistons (20), it must be noted that FIG. 4 shows the pistons (20) suspended from the carriages (40) and further shows some oblique front and rear reinforcing rods (45) reinforcing the connection of the piston (20) to the carriage (40) and ensuring that the piston (20) maintains its vertical and longitudinal position (i.e. a position parallel to the longitudinal direction (5) of the barrier (4)) while the piston (20) is moving transversely forwards and backwards in the water, and with water both in front of and behind the piston (20). These reinforcing rods (45) extend from a front wall and from a rear wall of the piston (20) towards, for example, lateral beams (43) of the carriage (40).

Figure 7:
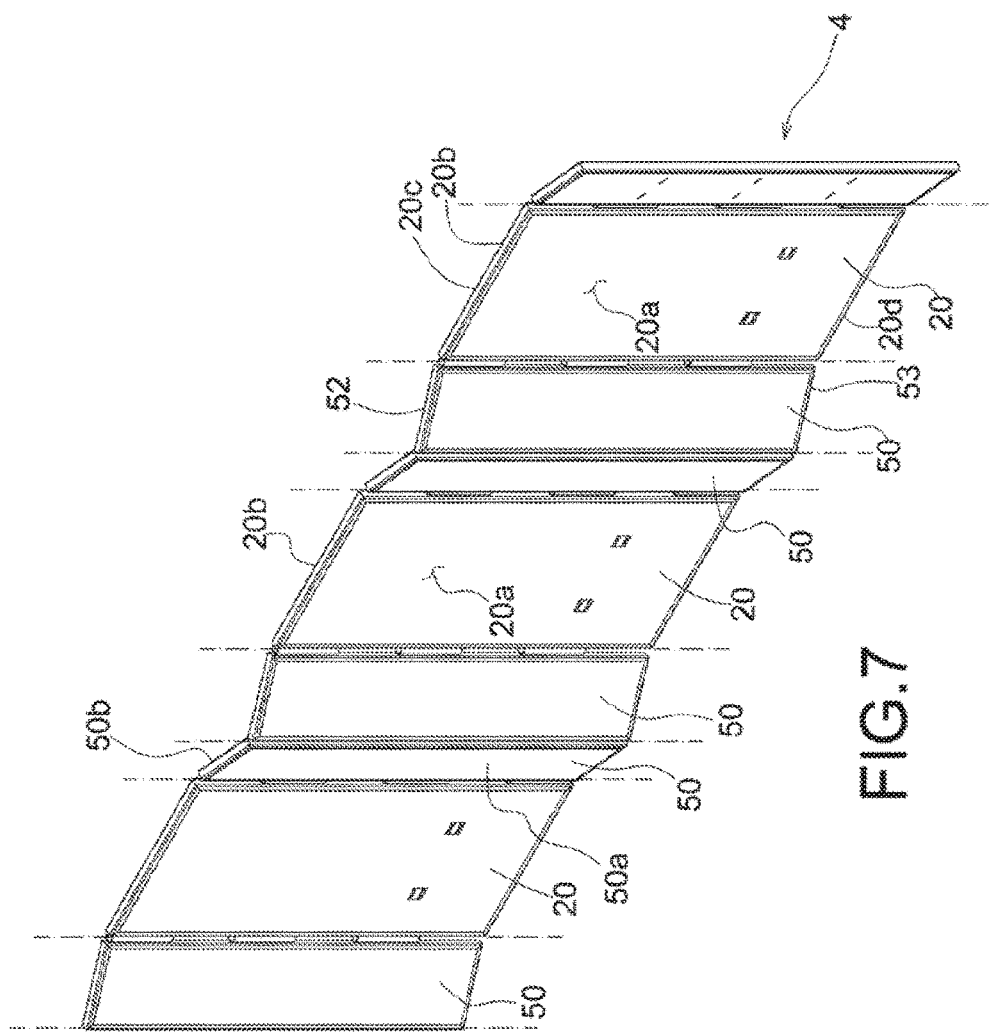
FIG. 7 shows an enlarged perspective view of three pistons of the system of FIG. 1, providing details on the layout of two pairs of articulated panels placed between every two adjacent pistons.

Preferably, as shown in FIG. 4 and in greater detail in FIG. 7, two vertical articulated panels (50) are arranged between each two adjacent pistons (20), where each panel (50) is articulated to a piston (20) and to the other panel (50) with respect to vertical rotation axes (51). In this case, the vertical rotation axes (51) are provided by hinged connections (it is not ruled out that a very small amount of water can pass through the hinged connections between panels and between panels and pistons, this not being relevant for the invention). Having two articulated panels enables the entire barrier (4) to be movable and therefore able to push all of the water that is facing it to both sides of the barrier (4). Furthermore, the articulated panels (50) enable the rigid pistons (20) to be able to move with a time offset between them and therefore change the relative distance between these rigid pistons (20), without the system jamming; at the same time, having only two articulated panels (50) prevents any uncontrolled movements of the movable articulated panels (50), as both panels (50) are articulated on one of their edges to a rigid piston (20).

The articulated vertical panels (50) in the present embodiment comprise an upper edge (52) and a lower edge (53). In the present embodiment, the upper edge (52) of the panels (50) is at the same height as the upper edges (20c) of the pistons (20) between which the panels (50) are positioned, and preferably all of these upper edges (20c, 52) are higher than the crest of the wave (W). The lower edge (53) of the articulated panels (50) is at the same height as the lower edge (20d) of the pistons (20), and preferably all of these lower edges (20d, 53) are flush with the floor or substantially flush (with a millimeters or hardly a few centimeters of separation, and preferably less than one centimeter). The barrier (4) is therefore made up of the combination of pistons (20) and panels (50), and water does not pass between adjacent panels (50) or between adjacent panels (50) and pistons (20), or above or below the barrier (4). In other words, both the pistons (20) and the panels (50) push the water ranging from the floor of the system (optionally with millimeters or hardly a few centimeters of separation, and preferably less than one centimeter) to the crest of the wave, i.e. they are capable of moving the entire column of water and therefore maximising the height of the waves (W) generated on both sides of the serpentine moving barrier (4). Furthermore, minimising or preventing gaps through which the water can pass under the panels (50) avoids water passing from the crest side to the valley side due to a pressure difference when the valley of a wave is on one side of the pistons (20) and panels (50) and a crest of a wave is on the opposite side, which would mean that energy is being wasted in the movement of the pistons (20) by moving water in vain, i.e. without contributing to generate surfable waves.

Figure 10:
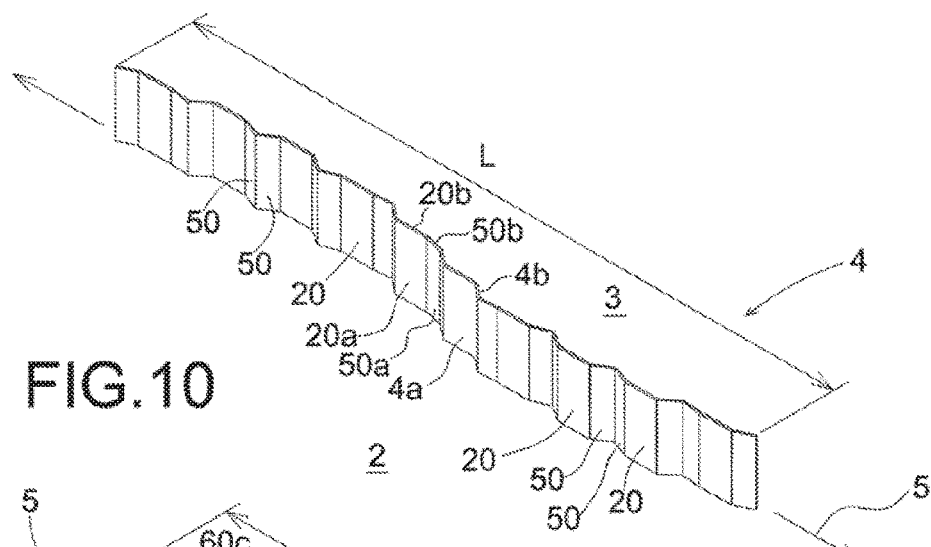
FIG. 10 shows a perspective view of the barrier of the system of FIG. 1.
Figure 15:
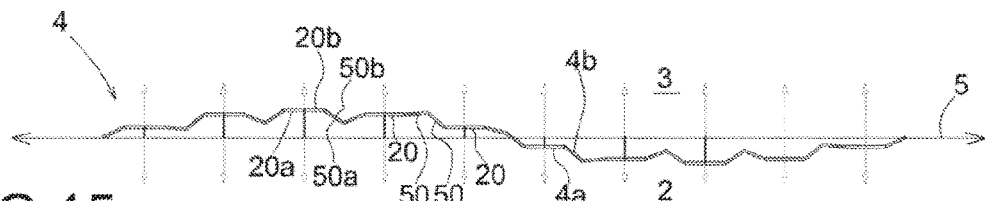
FIG. 15 shows a top plan view of the barrier of FIG. 10.

FIGS. 10 and 15 show a perspective view of the barrier (4) of the present embodiment. As has been explained, the barrier (4) is formed of a series of articulated panels, and more specifically of a series of panels or pistons (20) permanently arranged in the longitudinal direction (5) of the barrier (4) and movable in a transverse direction, interleaved with pairs of articulated panels (50). The barrier (4) has a front side (4a) and a rear side (4b) along the total length (L) of the barrier (4), wherein the total length (L) is understood to be the dimension of the barrier (4) in the longitudinal direction (5). The front side (4a) is made up of front sides (20a) of the pistons (20) and front sides (50a) of the articulated panels (50), whilst the rear side (4b) is made up of rear sides (20b) of the pistons (20) and front sides (50b) of the articulated panels (50). The front side (4a) of the barrier (4) is facing the first mass of water (2) and the rear side (4b) is facing the second mass of water (3). The front side (4a) and the rear side (4b) of the barrier (4) preferably extend from the floor of the system (1) underneath the barrier (4) to a height above the crest of the wave (W) that is generated by the system (1). The barrier (4) is movable along its entire length (L) with a serpentine movement, where the front side (4a) pushes water from this first mass of water (2) towards the first reef (12) (FIG. 1) for the formation of a surfable wave (W) in the first mass of water (2), whilst a rear side (4b) pushes water from this second mass of water (3) towards the second reef (15) for the formation of a surfable wave (W) in the second mass of water (3). The serpentine movement is illustrated in FIG. 15, where it is shown how the pistons (20) move with a time offset between them towards the first mass of water (2) and the second mass of water (3), wherein each piston (20) moves backwards and forwards at a different time with respect to the following piston (20), the panels (50) accompanying the pistons (20), so that the moving barrier (4) forms lateral undulations that move reciprocally towards the sides whilst moving in a longitudinal direction (5), similar to the movement of a snake. The serpentine movement of the barrier (4) generates waves in both masses of water (2, 3) with very high energy efficiency, contributing to the economic viability of the device. The waves travel towards the respective reefs (12, 15), and breaking and therefore surfable waves are formed in the area of the reefs (12, 15) which then continue to travel through the areas of water (2, 3). The reefs (12, 15) can be positioned at a short distance from the barrier (4) less than or equal to approximately the height of the desired wave (W) multiplied by seven, which allows the wave to lose very little height before breaking and therefore allows maximising the height of the wave (W) in relation to the energy consumption of the system (1).

The serpentine movement of the barrier (4) allows generating waves (W) that are not parallel to the barrier (4), i.e. that form an angle other than zero with the longitudinal direction (5) of the barrier (4). This enables the reefs (12, 15) to be positioned at a minimum distance from the barrier (4), sufficient for the waves to reach a sufficient height on arrival at the reefs (12, 15), and yet succeeding in forming a wave (W) that breaks gradually in the area of the reef (12, 15), the wave thus being surfable. Thus, it is possible to generate surfable waves (W) using a system (1) with a relatively reduced "footprint" (thanks to the limited separation between the barrier and reefs), and therefore requiring a reasonable volume of water and construction size, both said aspects being essential in the economic viability of the wave lagoon.

Another important advantage of the system (1) based on generating waves by both the front sides or surfaces and the rear sides or surfaces of the serpentine barrier is that the system has very high usability as it is capable of generating a large number of waves in relation to the machinery and civil works required to build the system. As far as the machinery is concerned, only one row of pistons with their respective drive systems is required to generate opposing waves. Furthermore, mechanisms for compensating hydrostatic forces are not required on the non-operational side of the barrier (as both sides move water towards a mass of water to generate waves). In addition, no energy is lost in the rear sides of the barrier, in comparison with systems known in the prior art in which the pistons only generate waves in a forward direction and their rear sides are in a wet environment where the water moves but is not used to generate waves. As for the civil works, as mentioned heretofore, the serpentine movement of the barrier allows generating a wave arranged at an angle with respect to a reef and obtaining a gradually breaking wave whilst minimising the distance from the reef to the barrier and therefore minimising the installation's "footprint". An additional advantage is that this system does not require as much waterproofing as conventional systems in which the front sides of the pistons push water and the rear sides of the pistons are in a dry environment. All of these advantages lead to the system being economically viable and able to be successfully implemented.

Figure 11:
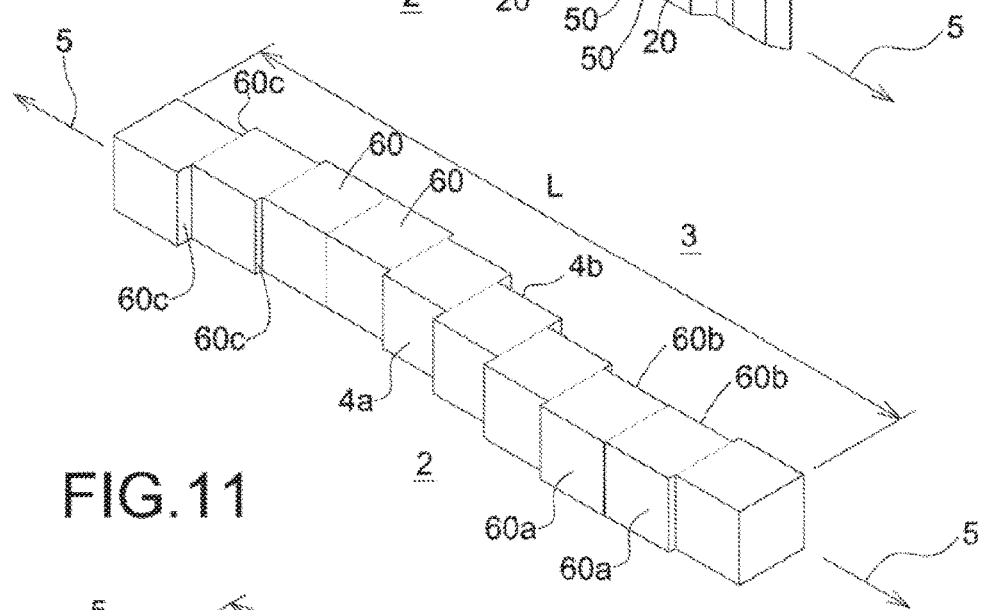
FIG. 11 shows a perspective view of a second embodiment of a barrier as per the invention.
Figure 16:
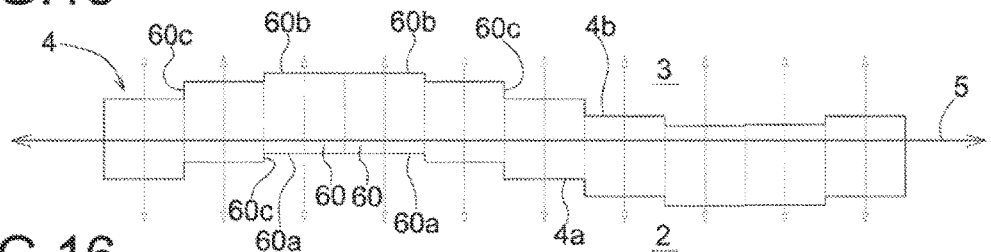
FIG. 16 shows a top plan view of the barrier of FIG. 11.

FIGS. 11 and 16 show an alternative embodiment of a serpentine moving barrier (4), in this case made up of a series of adjacent blocks (60) so that water cannot pass through, under or above them from the first mass of water (2) towards the second mass of water (3) or vice versa. The blocks (60) can be moved reciprocally towards the first mass of water (2) and towards the second mass of water (3) with a time offset between them, maintaining an overlap between the blocks (60) that prevents the passage of water between them. The front side (4a) of the barrier (4) is composed of the front sides (60a) of the blocks (60), whilst the rear side (4b) of the barrier (4) is composed of the rear sides (60b) of the blocks (60). The lateral sides (60c) of the blocks (60) also serve to separate the first area of water (2) from the second area of water (3), i.e. act as a barrier to the passage of water between the masses of water (2, 3).

Figure 12:
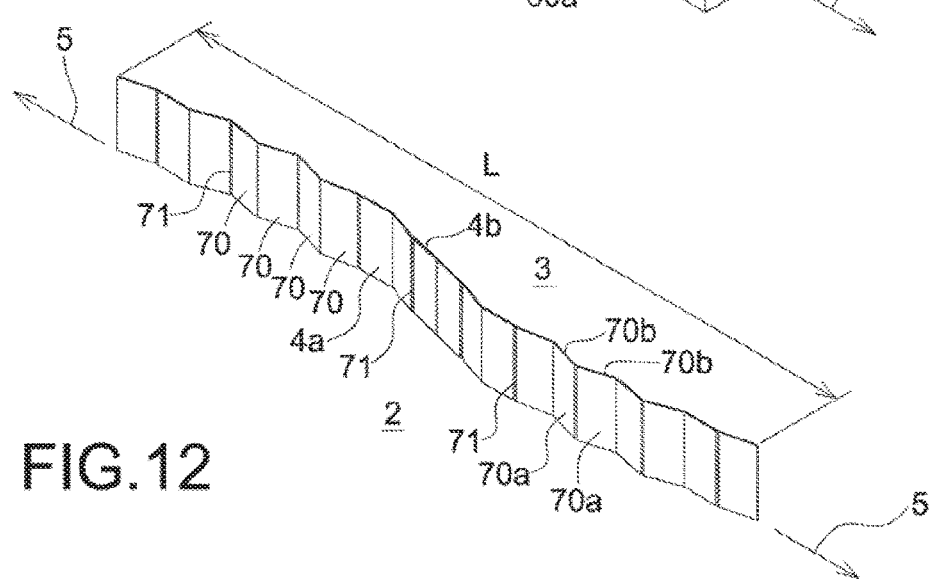
FIG. 12 shows a perspective view of a third embodiment of a barrier as per the invention.
Figure 17:
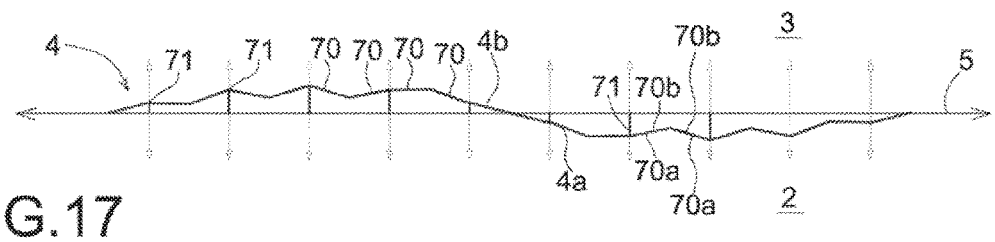
FIG. 17 shows a top plan view of the barrier of FIG. 12.

FIGS. 12 and 17 show an alternative embodiment of a serpentine moving barrier (4), in this case made up of a series of articulated panels (70), with some edges (71) being driving edges, operated by respective drive systems (for example similar to those of the first embodiment). The edges (71) are movable transversely and reciprocally towards the first mass of water (2) and towards the second mass of water (3) with a time offset between them. In other words, the edges (71) are equivalent to pistons (20) as in the first embodiment, but built with a negligible width, whilst the panels (70) are equivalent to the panels (50) of the first embodiment. The front side (4a) of the barrier (4) is composed of the front sides (70a) of the panels (70), whilst the rear side (4b) of the barrier (4) is made up of the rear sides (70b) of the panels (70). As in the previous embodiments, the barrier (4) prevents the passage of water through, under and above the barrier (4).

Figure 13:
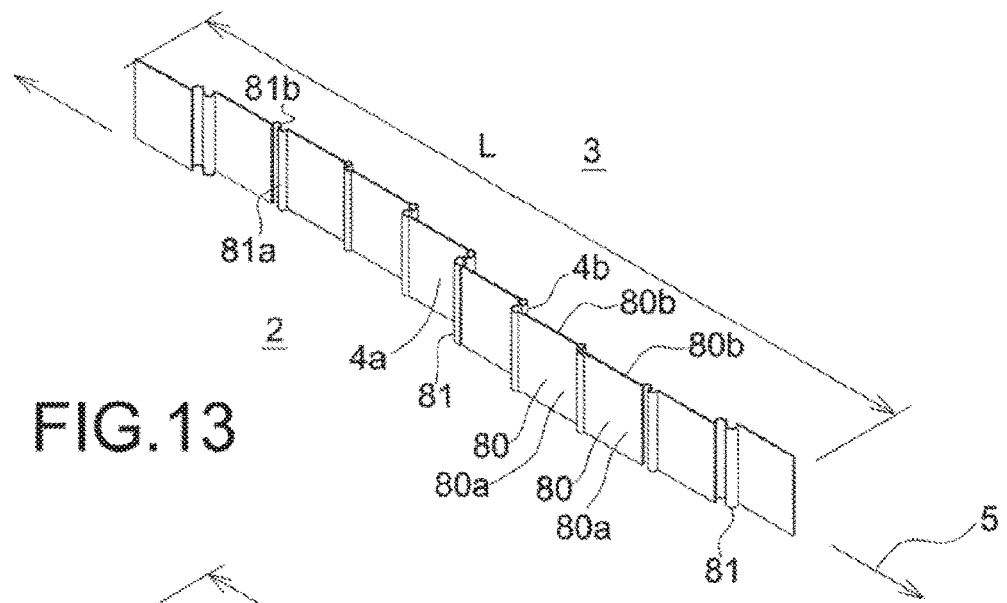
FIG. 13 shows a perspective view of a fourth embodiment of a barrier as per the invention.
Figure 18:
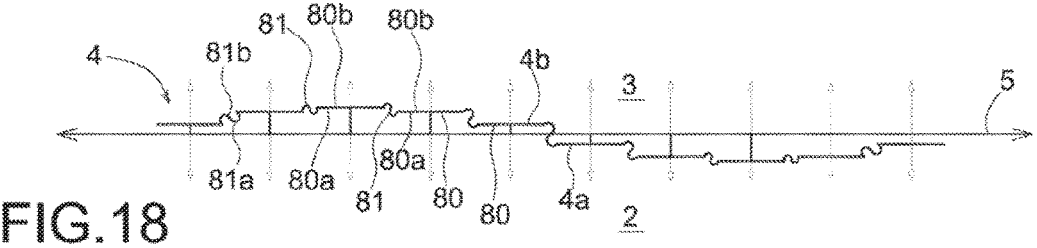
FIG. 18 shows a top plan view of the barrier of FIG. 13.

FIGS. 13 and 18 show an alternative embodiment of a serpentine moving barrier (4), in this case made up of a series of panels (80) arranged in the longitudinal direction (5) of the barrier (4) and transversely movable in a sequence or with a time offset between them. The panels (80) have a front side (80a) and a rear side (80b). The front side (4a) of the barrier (4) includes the front sides (80a) of the panels (80), whilst the rear side (4b) of the barrier (4) includes the rear sides (80b) of the panels (80). The front sides (80a) of each two adjacent panels (80) form contiguous transverse surfaces of the front side (4a) of the barrier (4); similarly, the rear sides (80b) of each two adjacent panels (80) form contiguous transverse surfaces of the rear side (4b) of the barrier (4). At least one flexible element, such as a canvas, is arranged between contiguous transverse surfaces of the front side (4a) of the barrier (4), i.e. between the front sides (80a) of the panels (80). Similarly, at least one flexible element, such as a canvas, is arranged between the contiguous transverse surfaces of the rear side (4b) of the barrier (4), i.e. between the rear sides (80b) of adjacent panels (80). In the present embodiment, there is a single flexible element (81) or canvas between each two adjacent panels (80), not ruling out that there may be more than one canvas, for example, more than one canvas in parallel to one another. The front side (4a) of the barrier (4) includes the front sides (81a) of the flexible elements (81), whilst the rear side (4b) of the barrier (4) includes the rear sides (81b) of the flexible elements (81). As in the previous embodiments, the barrier (4) prevents the passage of water through, under and above the barrier (4).

Figure 14:
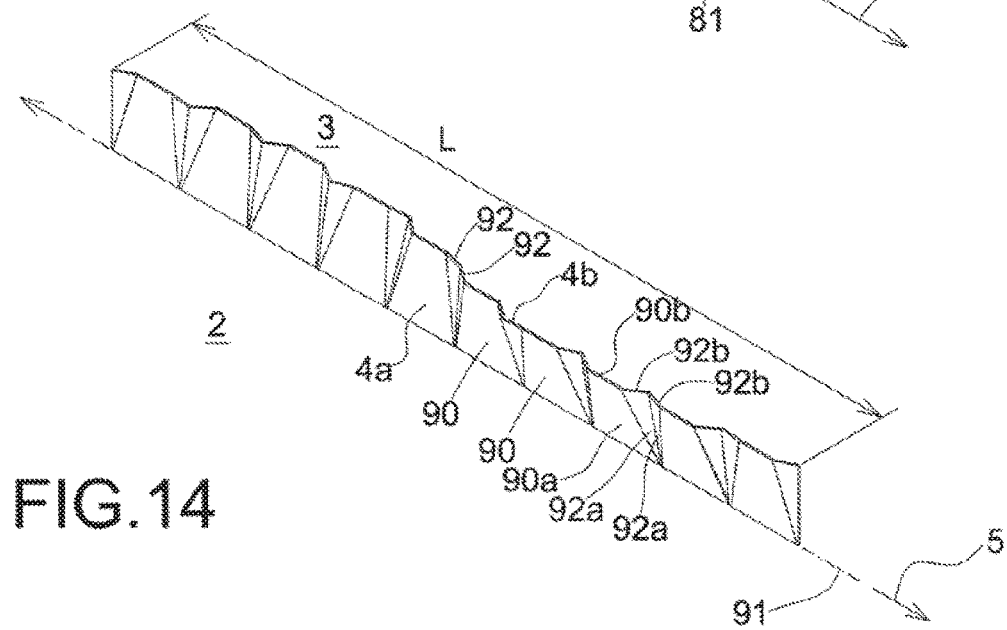
FIG. 14 shows a perspective view of a fifth embodiment of a barrier as per the invention.
Figure 19:
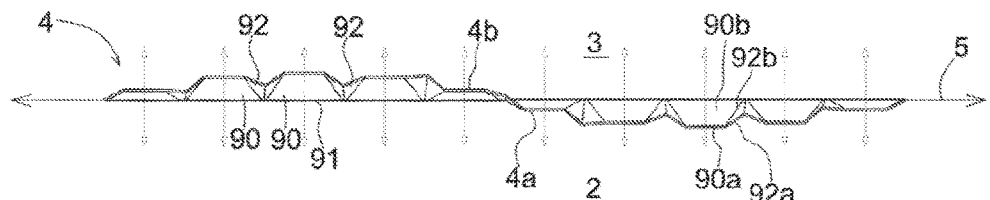
FIG. 19 shows a top plan view of the barrier of FIG. 14.

FIGS. 14 and 19 show an alternative embodiment of a serpentine moving barrier (4), made up of a series of plates that move reciprocally towards the first mass of water (2) and towards the second mass of water (3) with a time offset between them, as in some of the previous embodiments. However, in this case, the series of plates comprises plates (90) which are arranged in the longitudinal direction (5) of the barrier (4) and which are pivotable with respect to a rotation axis (91) arranged on a lower side of each pivotable plate (90). Intermediate elements (92), which are rigid, flexible or a combination thereof, are arranged between the pivotable plates (90) interconnecting the longitudinal plates (90) and allowing to form a serpentine-moving and non-permeable barrier (4). In the present embodiment, the intermediate elements are flexible triangular canvases. The front side (4a) of the barrier (4) is composed of the front sides (90a) of the plates (90) and the front sides (92a) of the intermediate elements (92), whilst the rear side (4b) of the barrier (4) is composed of the rear sides (90b) of the plates (90) and the rear sides (92b) of the intermediate elements (92). As in the previous embodiments, the barrier (4) prevents the passage of water through, under and above the barrier (4).

Alternative embodiments to those described are contemplated.

For example, it is contemplated that one or both reefs (12, 15) can be partially or fully curved in top plan view. For example, FIGS. 20 and 21 show an alternative system (1) fitted with a straight first reef (12) and a curved second reef (15).

In other embodiments of the invention, it is contemplated that any of the previously described components and elements can be applied to any wave generator system, regardless of whether it generates waves towards both sides of the barrier or towards just one side of the wave generator, i.e. there being only one important mass of water and reef, on one of the two sides of the wave generator.

FIGS. 20 and 21 allow illustrating an optional additional aspect of the present invention, which is applicable to reefs that are straight, curved or present any other configuration; i.e. it must not be understood that the fact that this additional aspect is being shown along with a straight first reef (12) and a curved second reef (15) limits this additional aspect to this specific reef configuration. This additional aspect consists in that the reefs (12, 15) extend beyond the barrier (4) delimiting a deep channel (100) between them. Preferably, as shown in the figure, the reefs (12, 15) extend beyond an imaginary vertical plane (140) arranged at the end of the barrier (4) and perpendicular to the wavefront of each wave (W). This allows making the most of the full length of the barrier (4) for generating surfable waves (W). Therefore, as can be seen in the figures, the reefs (12, 15) are partially surrounded by the channel (100); more specifically, the channel (100) of the present embodiment surrounds each reef (12, 15) and its respective shallower area (14, 17) along one side thereof, while other sides of the shallower areas (14, 17) are surrounded by a shore (110) and a wall (112).

The channel (100) is deeper than the shallower areas (14, 17) and is placed in continuation of the deeper areas (13, 16) of the floor (6, 8) under the masses of water (2, 3). The channel (100) is located after the barrier (4) in the longitudinal direction (5) and preferably extends to at least one shore (110) towards which the waves (W) are directed and which is reached by the displaced water (i.e. the shore (110) which is in contact with the first mass of water (2) or the second mass of water (3)). Specifically, the channel (100) extends to respective ends (114) of the shallower areas (14, 17) through which the waves (W) exit the shallower areas (14, 17).

The channel (100) is communicated with the deeper areas of the first mass of water (2) and the second mass of water (3) and allows water to return towards the barrier (4) as shown by the arrows (A, B) in the figures. In other words, using the first mass of water (2) as an example, the water is displaced by the barrier (4) towards the first reef (12), forming surfable waves (W) in the vicinity of the first reef (12) and the surfable waves (W) traveling along the shallower area (14) of the first mass of water (2). The displaced water eventually reaches an edge or shore (110). While waves (W) are being formed, the average water level in the mass of water (2) is highest in the area of the shore (110) and lowest in the area of the wave generator (4). This is caused by the waves (W) pushing water in their direction, i.e. from the wave generator (4), where they are created, towards the shore (110), where they die. Therefore, water tries to find a path to return from the area of the shore (110) to the area of the wave generator (4).

A current of water is then formed that moves substantially parallel to this edge or shore (110) until reaching the end (114) of the shallower area (14). When reaching the end (114), water finds a deeper area: the deep channel (100) (which is arranged extending to the end (114) of the shallower area (14) and to the shore (110)). Once the channel (100) is reached, the current of water tends to remain inside the channel (100) as it encounters less friction, due to the fact that the channel (100) is deeper than the shallower area (17) and the water therefore comes into contact with a smaller floor surface area by volume of water moved. Thus, the current of water remains in the channel (100) and returns towards the barrier (4) along the channel (100) and along the deeper area (13) of the floor (6) of the first mass of water (2).

This configuration of the channel (100) achieves diverse advantageous effects. On one hand, the water is returned while kept apart from the surfable waves (W) (which are located in the shallower area (14, 17)), practically avoiding the negative impact of the currents on the surfable side of the waves (W) which commonly takes place when waves (W) to the shores (110). Furthermore, in the area of the channel (100) and the deeper areas (13, 16), the return water current has a lower speed than the current speed in the vicinity of the shores (110), as the same flow of water now moves at a greater depth; therefore, the return of water to the area adjacent to the barrier (4) occurs with minimum interference with the water in front of the barrier (4). It is also advantageous to have the flow towards the barrier (4) tend to concentrate in the channel (100), as that means that the surfing areas (shallower areas (14, 17)) are not negatively affected by the currents.

Furthermore, in the present embodiment, one or more guiding elements (120) are included at the end of the barrier (4), whose function is to partially or fully prevent the wave that reaches the barrier (4) from turning and heading towards the opposite mass of water (2, 3). In the present embodiment, the guiding elements (120) are several protrusions having lateral surfaces (122) at an angle, to direct the water. However, alternative embodiments are contemplated in which the guiding element (120) may be a wall, island, or any other protrusion on the floor of the system (1). For example, the guiding element can be a wall that extends from the end of the barrier (4) towards the shore (11), such as all the way to the shore (110) or almost, dividing the channel (100) in two, i.e. delimiting one portion of channel (100) for each mass of water (2, 3).

FIGS. 22 to 27 show six alternative illustrative embodiments of a wave generator system (1) in accordance with the invention. The figures include reference numerals that have been used in the previous embodiment, in order to identify identical technical features. As can be observed, each one of these wave generator systems (1) comprises a wave generator (4)—such as a barrier similar to the barriers described heretofore—, a mass of water (2) and a reef (12). The reef (12) is formed on a floor (6) beneath the mass of water (2) and provides a transition between a deeper area (13) arranged between the reef (12) and the wave generator (4) and a shallower area (14) arranged beyond the reef (12). The wave generator (4) faces the mass of water (2) and is configured to cause the movement of water towards the reef (12) and the formation of a wave (W) in the mass of water (2). As can be seen, the reef (12) is at least partially surrounded by a channel (100). The channel (100) is deeper than the shallower area (14) and connects the deeper area (13) with an end (114) of the shallower area (14) through which the wave (W) exists the shallower area (14).

Figure 22:
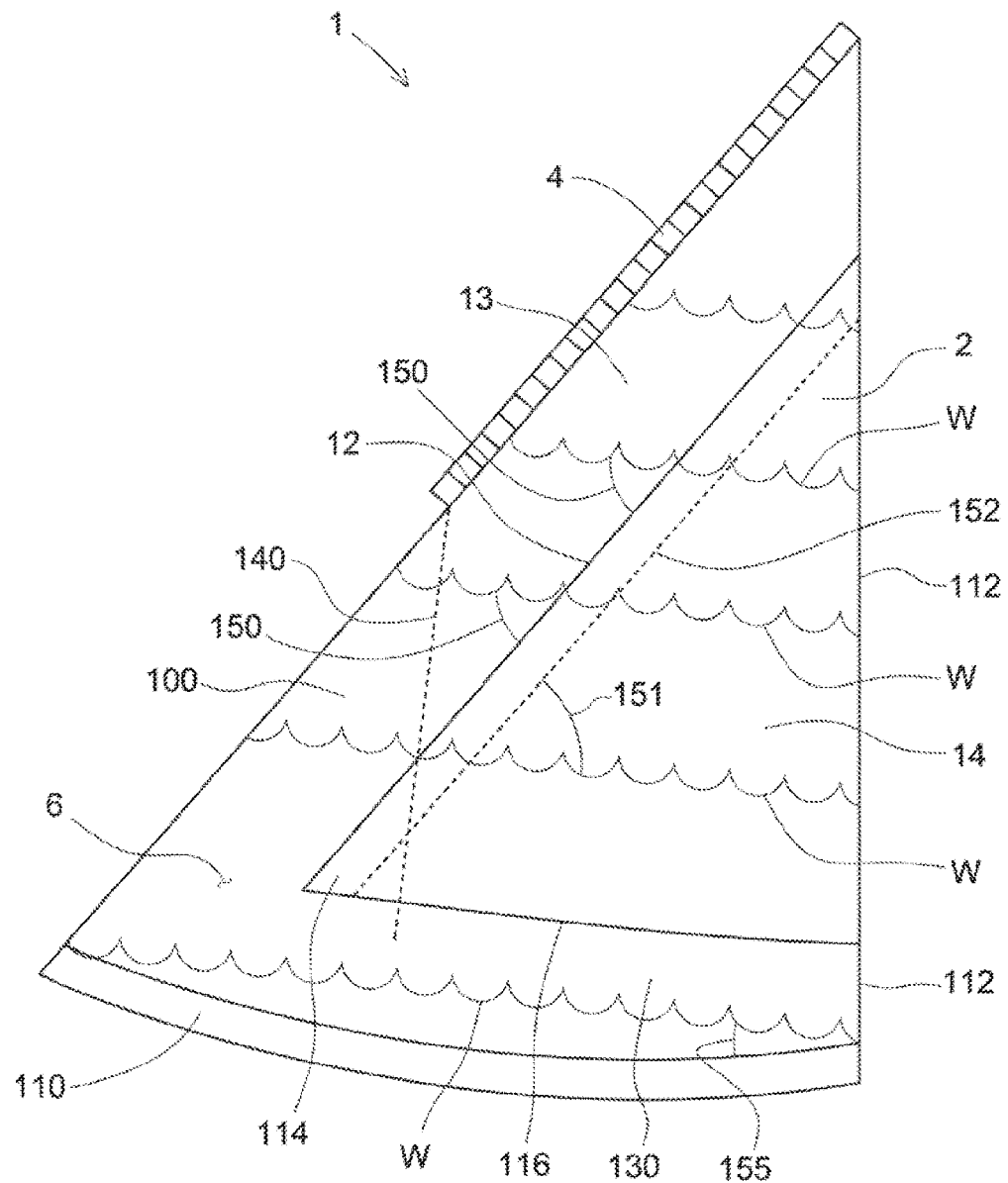
FIG. 22 shows a top plan view of another embodiment of a wave generator system in accordance with the invention.

In the system (1) of FIG. 22, the reef (12) extends beyond the wave generator (4) in such a way that the angle (150) formed by the reef (12) and the wave (W) in top plan view remains substantially constant as the wave (W) travels forward. This guarantees that the peeling angle (151) of the wave (W) does not vary; the "peeling angle" (151) is understood to be the angle between the trajectory (152) followed by the breaking point of the wave (W) as the wave (W) travels forward and the direction in which the wave (W) travels forward, wherein this angle must be between 30 and 50 degrees in order for the wave (W) to be a good surfable wave. In this way, the wave (W) continues to break and move forward with a correct breaking angle until, in losing energy as it travels away from the wave generator (4), the wave (W) ends of losing its surfable size. In addition to making a better use of the generated wave (W), the wave (W) reaches the shores with less force, increasing safety and reducing rebounds.

Furthermore, in the system of FIG. 22, the width of the channel (100) is not narrower than (and is preferably substantially constant and equal to) the distance between the reef (12, 15) and the barrier (4). Alternatively or additionally, the depth of the channel (100) can be substantially constant and equal to the depth of the deeper zone (14). With these features, turbulences are successfully prevented without having to build an excessively deep and/or wide channel (100), which would considerably increase the cost of the civil construction required to build the wave generator system (1).

The system (1) of FIG. 22 further includes a recollection channel (130) arranged between, and along, the shallower area (14) and the shore (110), and connected to the return channel (100). The recollection channel (130) is deeper than the shallower area (14) and helps water accumulated by the waves' pressure against the shore (100) to travel to the return channel (100) without returning towards the reef (12). This contributes to reduce the currents and turbulences in the surf area, i.e. the shallower area (14) beyond the reef (12). The recollection channel (130) further provides a deep zone where surfers can finish surfing their wave and safely jump off the board before the wave impacts the shore (110). Preferably, the width of the recollection channel (130) ranges between 3 and 5 meters and the depth ranges between 0.5 and 1.5 meters.

Furthermore, in the system (1) of FIG. 22, the recollection channel (130) extends from the end (114) of the shallower area (14) where the return channel (100) begins, to an opposing wall (112) (which in turn extends substantially to the wave generator (4)). In other words, the recollection channel (130) extends along the entire rear area (116) of the shallower area (14), and both channels (100, 130) jointly extend along the entire shore (110). This allows practically all water of waves (W) to be collected in the channels (130, 100) and returned through the channels (130, 100), around the shallower area (14), to the deeper area (13) between the wave generator (4) and the reef (12).

In addition, as can be observed, each wave (W) travels forward forming a wavefront which is not parallel to the shore (110), in such a way that the waves (W) first impact the spot of the shore (110) farthest from the return channel (100) and such that the last area of the shore (110) impacted by the waves (W) is next to the end (114) and the return channel (100). Preferably, the wave (100) or wavefront forms an angle (151) from 3 to 40 degrees with the shore (110).

Figure 23:
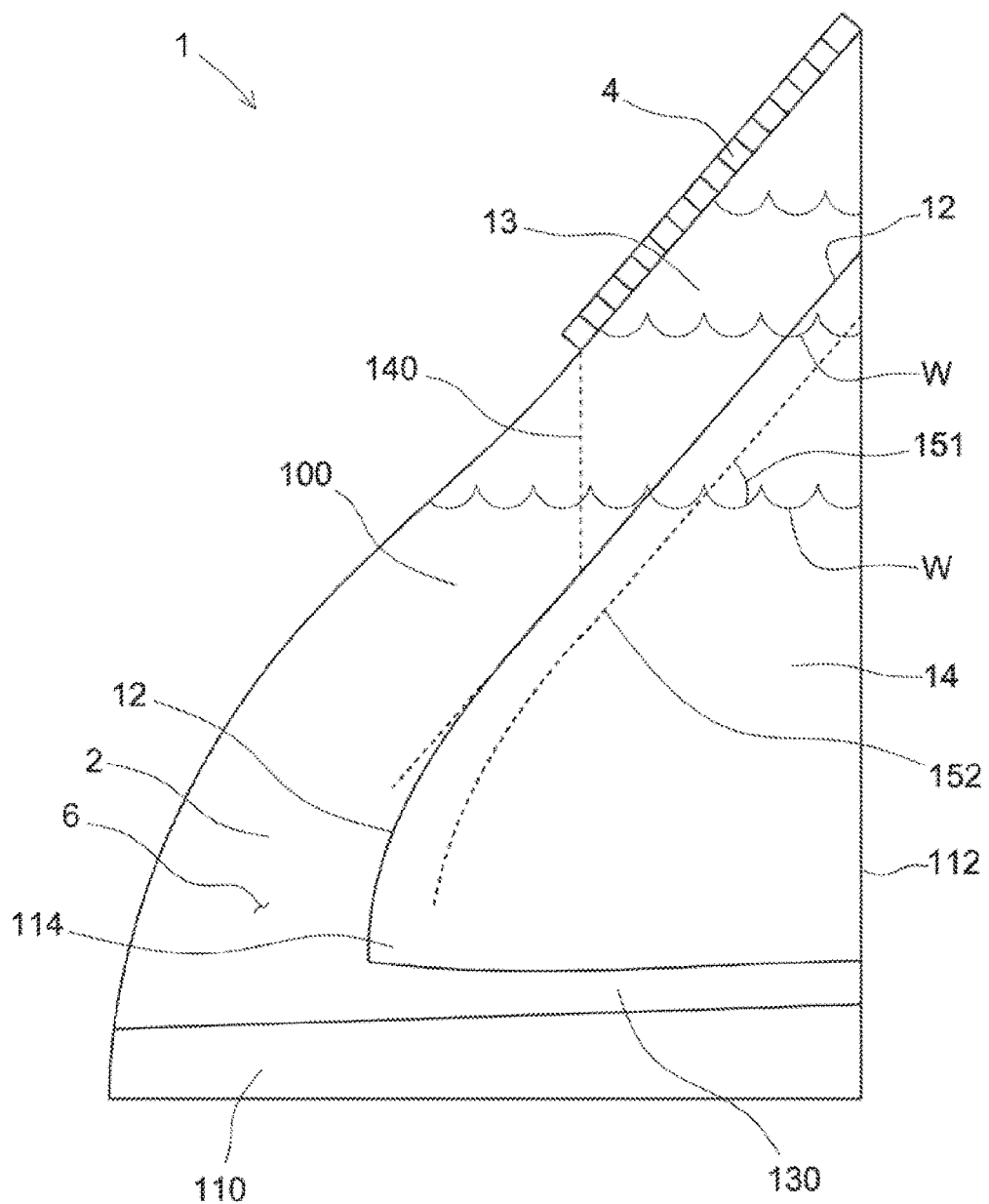
FIG. 23 shows a top plan view of another embodiment of a wave generator system in accordance with the invention.

In the system (1) of FIG. 23, the reef (12) extends significantly beyond the wave generator (4) and is not entirely straight, but rather has a curved section arranged farther from the wave generator (4). In this system (1), as can be seen, the peeling angle (151), or angle formed between the trajectory (152) followed by the breaking point of the wave (W) as the wave (W) travels forward and the direction in which the wave (W) travels forward, changes progressively to a certain extent, but preferably remains within 30 to 50 degrees.

Figure 24:
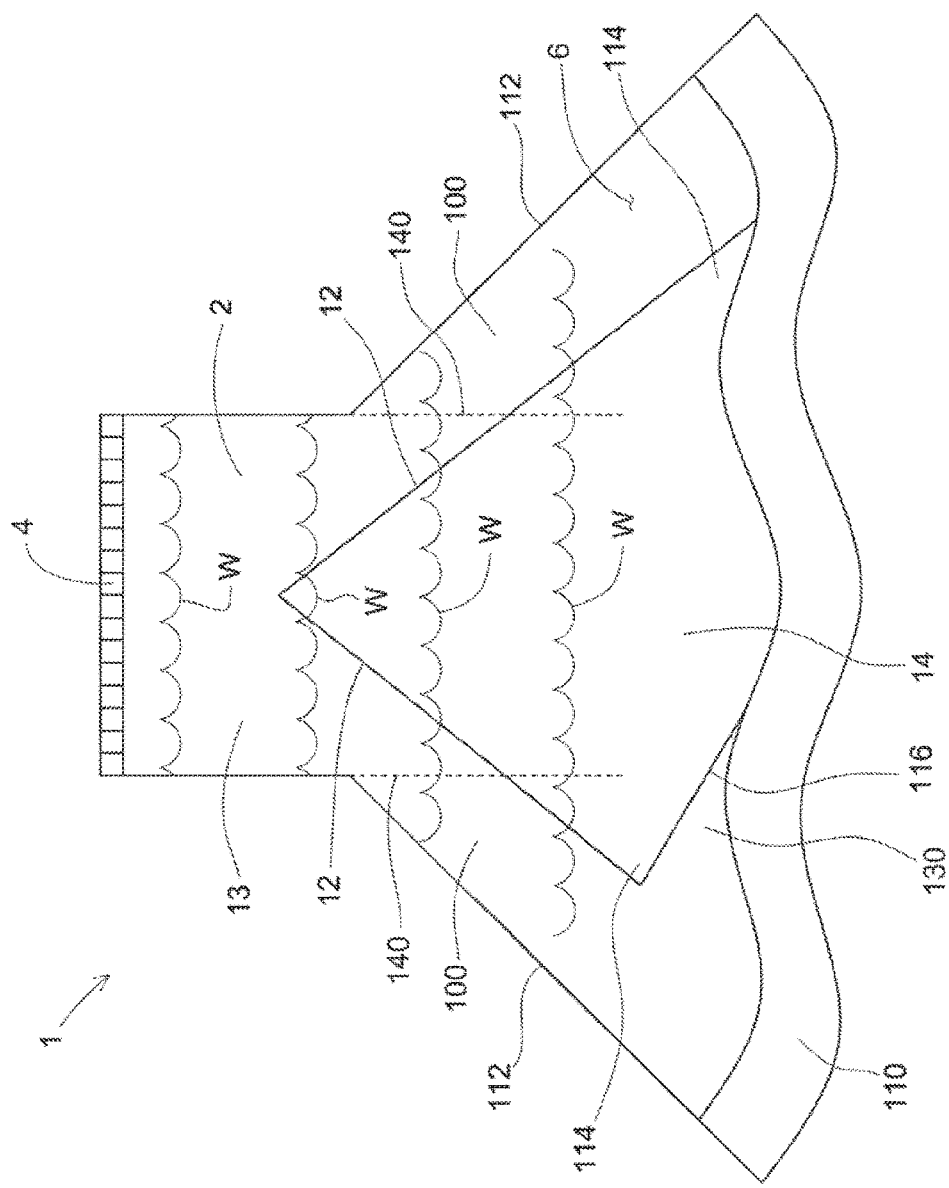
FIG. 24 shows a top plan view of another embodiment of a wave generator system in accordance with the invention.

In the system (1) of FIG. 24, it can be observed that a return channel (100) is included on both sides of the reef (12). In addition, on one of the sides there is a small recollection channel (130) that extends along part of the rear area (116) of the shallower area (14) and the shore (110) and communicates with the channel (100). On the opposite side, instead, there is no recollection channel (130); instead, the shallower area (14) extends to the shore (110). This asymmetry can help fulfil restrictions due to the available space and/or can seek to generate different waves on each side of the reef (12).

Figure 25:
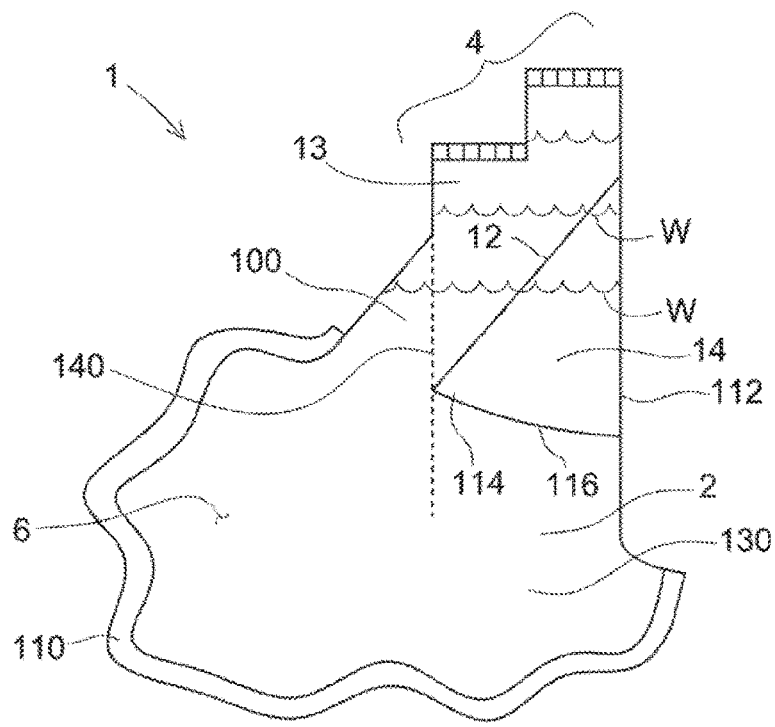
FIG. 25 shows a top plan view of another embodiment of a wave generator system in accordance with the invention.

The system (1) of FIG. 25 includes a large-width recollection channel (130) between the rear area (116) of the shallower area (14) and the shore (110). The recollection channel (130) extends along the entire rear area (116) of the shallower area (14) and the shore (110), between the return channel (100) and an opposing wall (112). In this embodiment, the reef (12) does not extend beyond the imaginary vertical plane (140). The large width of the recollection channel (130) allows the recollection channel (13) to provide a vast bathing zone with relatively calm water. This configuration favours using the system (1) for additional uses in addition to mere surfing, and also contributes in greater extend to dissipate the energy of the wave (W) before impacting the shore (110), increasing safety and preventing the backwash o wave rebound towards the next waves (W), which creates bumps and imperfections on the waves (W) and thus deteriorates the surfable waves (W).

Figure 26:
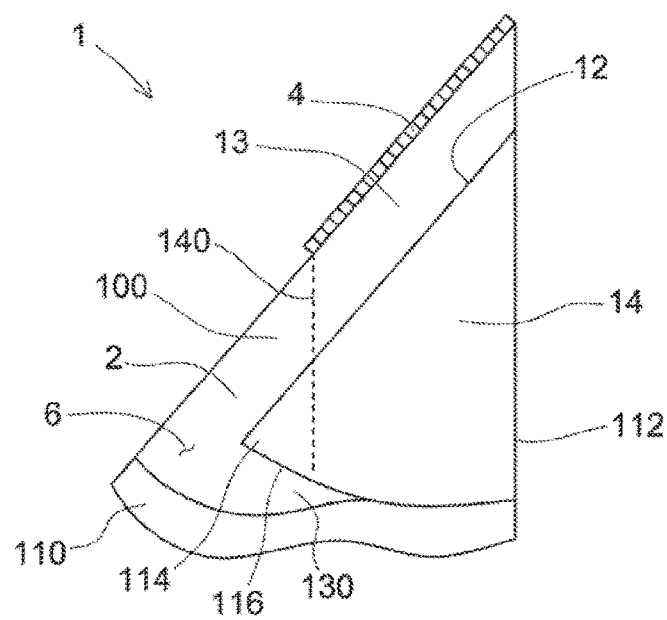
FIG. 26 shows a top plan view of another embodiment of a wave generator system in accordance with the invention.

In the system (1) of FIG. 26, the return channel (100) is disposed on one side of the shallower area (14) only, and is communicated with a small recollection channel (13) that does not extend along the entire length of the rear area (116) of the shallower area (14); instead, there is an area where the shallower area (14) reaches the shore (110). In addition, the reef (12) extends beyond the imaginary plane (140) disposed at the end of the wave generator (4) and perpendicularly to the wave (W).

Figure 27:
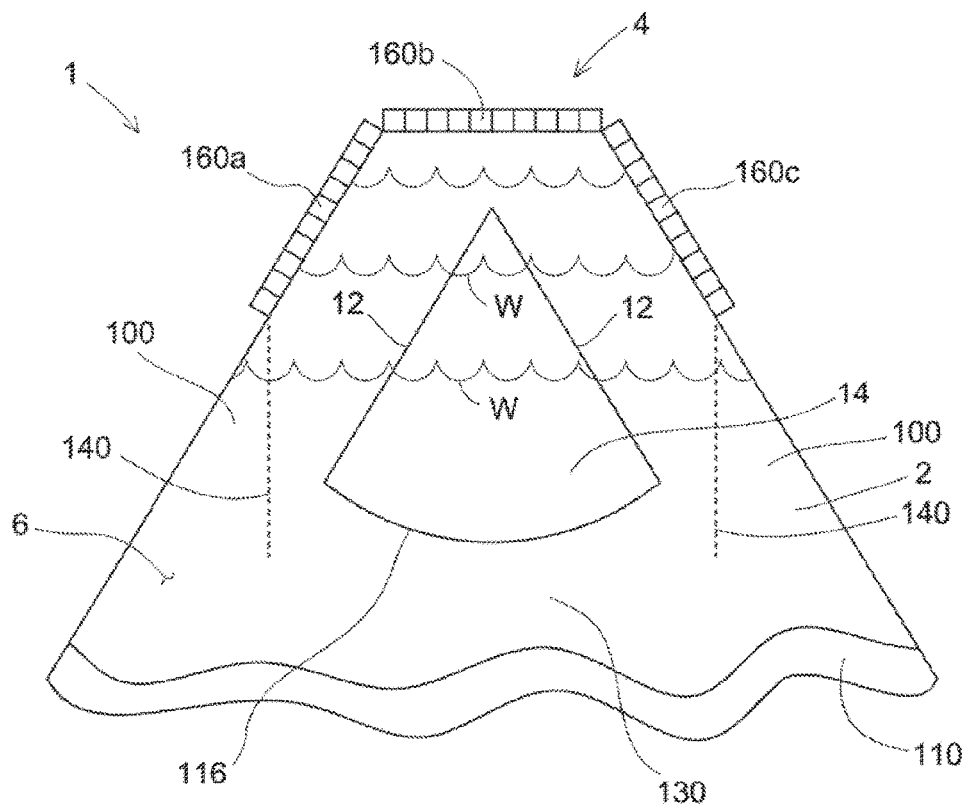
FIG. 27 shows a top plan view of another embodiment of a wave generator system in accordance with the invention.

In the system (1) of FIG. 27, the wave generator (4) is not elongated, but composed of generator subsets (160a, 160b, 160c), such as three piston lines, arranged in a formation similar to an inverted U, allowing to reduce the total width of the wave generator (4). A shallower area (14) is disposed in the middle of the mass of water (2), delimited by two reefs (12), one on each side of the shallower area (14). Thus, two return channels (100) are defined, on respective opposite sides of the shallower area (14), between the corresponding reef (12) and the generator subset (160a, 160c) facing it. The recollection channel (13) is disposed in the rear area (116) of the shallower area (14), extending from one return channel (100) to the other return channel (100), all three channels (100, 130, 100) thereby being communicated. In the present embodiment, the reef (12) does not extend beyond the imaginary plane (140) disposed at the end of the wave generator (4) and perpendicularly to the wave (W); however, alternative embodiments are contemplated in which one or both reefs (12) extend beyond the imaginary plane (140).

Figure 28:
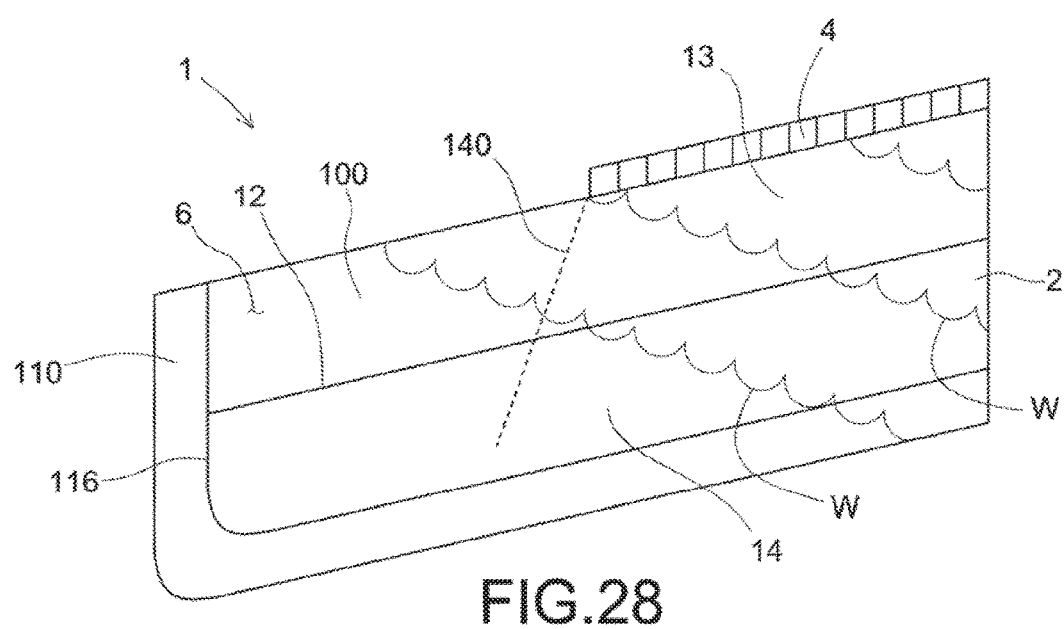
FIG. 28 shows a top plan view of another embodiment of a wave generator system in accordance with the invention.

In the system (1) of FIG. 28, the wave generator (4) is elongated and forming a line. The reef (12) is parallel to the wave generator (4) and extends beyond the imaginary plane (140) disposed at the end of the wave generator (4) and perpendicularly to the wave (W). The return channel (100) is substantially parallel to the reef (12) and to the wave generator (4) and has a width that is substantially constant and equal to the distance between the reef (12) and the wave generator (4). The present embodiment does not include a recollection channel (130); however, alternative embodiments are contemplated in which a recollection channel (13) can be provided between the shore (110) and the rear area (116) of the shallower area (14). The present configuration of the system (1) requires a relatively small space for it to be constructed.

In summary, the channel (100), which connects the deeper area (13; 16) to an end (114) of the shallower area (14; 17) through which the wave (W) exits the shallower area (14; 17), allows for the currents generated by water moved by the waves towards the shore in a wave pool to find a return path that is separated from the shallower area (14, 17); thus, the currents do not return through the surf area (the shallower area (14, 17) beyond the reef (12, 15)). In this way, the system prevents possible return currents from forming turbulences in the surface of the shallower area (14, 17) of the mass of water (2, 3) which could affect the face of waves (W) in the surf area and thus the quality of waves (W).

Finally, it should be noted that the concept of having a return channel (channel (100)) is applicable to any wave generating technology based on moving water in a mass of water towards a reef and shore in order to form surfable waves in a shallower area arranged beyond the reef. For instance, the return channel concept can be applied to piston-based wave generator systems (such as having horizontally moving pistons, vertically moving pistons or pivoting pistons), to pneumatic wave generator systems (based on injecting air to the mass of water in order to move the mass of water), or to wave generator systems based on discharging water against the mass of water.

The invention claimed is:

1. Wave generator system (1), characterised in that it comprises:
    a continuous and elongated barrier (4), arranged along a longitudinal direction (5), and having a front side (4a) and a rear side (4b) along a length (L) of the barrier (4), where the front side (4a) is facing a first mass of water (2) and the rear side (4b) is facing a second mass of water (3), wherein the barrier (4) prevents the passage of water between the first mass of water (2) and the second mass of water (3), through, above and under the barrier (4) and along the length (L);
    a first reef (12) formed in a floor (6) beneath the first mass of water (2) and at a distance from the front side (4a), and a second reef (15) formed in a floor (8) beneath the second mass of water (3) and at a distance from the rear side (4b), wherein
    the barrier (4) is movable along the whole of the length (L) with a serpentine movement, wherein the front side (4a) pushes water of the first mass of water (2) towards the first reef (12) for the formation of a wave (W) in the first mass of water (2), whilst the rear side (4b) pushes water from the second mass of water (3) towards the second reef (15) for the formation of a wave (W) in the second mass of water (3).

2. Wave generator system (1), according to claim 1, characterised in that the barrier (4) extends from a floor beneath the barrier (4).

3. Wave generator system (1), according to claim 2, characterised in that the barrier (4) extends up to a height above the crest of the wave (W).

4. Wave generator system (1), according to claim 1, characterised in that at least one of the first reef (12) and the second reef (15) is at least partially straight.

5. Wave generator system (1), according to claim 1, characterised in that at least one of the first reef (12) and the second reef (15) is at least partially curved.

6. Wave generator system (1), according to claim 1, characterised in that either at least one of the first reef (12) and the second reef (15) forms an angle of −20 to 20 degrees with the longitudinal direction (5) of the barrier (4) in top plan view.

7. Wave generator system (1), according to claim 1, characterised in that the barrier (4) comprises a series of articulated panels (70), with edges (71) that are reciprocally movable towards the first mass of water (2) and towards the second mass of water (3) with a time offset between them.

8. Wave generator system (1), according to claim 1, characterised in that the front side (4a) and the rear side (4b) of the barrier (4) have a plurality of front sides (50a; 60a; 80a; 90a) and rear sides (50b; 60b; 80b; 90b) arranged in the longitudinal direction (5) and movable transversely and reciprocally towards the first mass of water (2) and towards the second mass of water (3) with a time offset between them.

9. Wave generator system (1), according to claim 8, characterised in that the barrier (4) comprises at least one movable intermediate element (50; 60c; 81; 92) arranged between adjoining front sides (80a; 90a) of the front side (4a) of the barrier (4).

10. Wave generator system (1), according to claim 9, characterised in that the intermediate element (50; 60c; 81; 92) is rigid, flexible or a combination thereof.

11. Wave generator system (1), according to claim 8, characterised in that the barrier (4) comprises at least one movable intermediate element (50; 60c; 81; 92) arranged between adjoining rear sides (80b; 90b) of the front side (4a) of the barrier (4).

12. Wave generator system (1), according to claim 11, characterised in that the intermediate element (50; 60c; 81; 92) is rigid, flexible or a combination thereof.

13. Wave generator system (1), according to claim 8, characterised in that the barrier (4) comprises adjacent blocks (60) that are reciprocally movable towards the first mass of water (2) and towards the second mass of water (3)

with a time offset between them, wherein the front sides (60*a*) and the rear sides (60*b*) are rear and front sides of the blocks (60).

14. Wave generator system (1), according to claim 8, characterised in that the barrier (4) comprises plates (20; 80; 90) arranged in the longitudinal direction (5) and transversely and reciprocally movable towards the first mass of water (2) and towards the second mass of water (3) with a time offset between them, wherein the front sides (20*a*; 80*a*; 90*a*) and the rear sides (20*b*; 80*b*; 90*b*) are rear and front sides of the plates (20; 80; 90).

15. Wave generator system (1), according to claim 14, characterised in that the barrier (4) comprises at least one articulated element that is flexible, rigid or a thereof and arranged between adjacent plates (20; 80; 90).

16. Wave generator system (1), according to claim 14, characterised in that the barrier (84) comprises two rigid, articulated panels (50; 92) between adjacent plates (20; 90) and articulately connected to the adjacent plates (20; 90).

17. Wave generator system (1), according to claim 14, characterised in that each plate (90) is movable with a pivoting movement.

18. Wave generator system (1), according to claim 14, characterised in that each plate is movable with a translation and pivoting movement.

19. Wave generator system (1), according to claim 14, characterised in that each plate (20; 80) is movable with a translation movement.

20. Wave generator system (1), according to claim 19, characterised in that each plate (20) is operated by a drive system (21) arranged above the plate (4).

21. Wave generator system (1), according to claim 19, characterised in that each plate (20) is suspended from an upper structure (31).

22. Wave generator system (1), according to claim 19, characterised in that each plate (20) is suspended from a corresponding carriage (40) that is longitudinally movable forwards and backwards along a frame (24).

23. Wave generator system (1), according to claim 22, characterised in that each plate (20) is rigidly connected to a corresponding carriage (40).

24. Wave generator system (1), according to claim 22, characterised in that the frame (24) comprises lateral guide channels (29) on which lateral wheels (41) of the carriage (40) can roll.

25. Wave generator system (1), according to claim 24, characterised in that the carriage (40) comprises a rack (42) arranged between the lateral wheels (41) of the carriage (40), and the frame (24) has an associated motor and transmission set (22) that causes the rotation of a pinion (23) coupled to the rack (42), wherein rotation of the pinion (23) causes a longitudinal movement of the corresponding rack (42), carriage (40) and plate (20).

\* \* \* \* \*